(12) United States Patent
Bodurka et al.

(10) Patent No.: US 12,492,591 B2
(45) Date of Patent: Dec. 9, 2025

(54) DOOR SYSTEM WITH WIRE HARNESS ROUTED INSIDE OF DOOR AND OUTER DOOR FRAME FOR CONNECTION WITH ELECTRIC DEVICES

(71) Applicant: Masonite Corporation, Tampa, FL (US)

(72) Inventors: Alex Bodurka, Portage, MI (US); Steven B. Swartzmiller, Batavia, IL (US); Cory J. Sorice, La Grange, IL (US)

(73) Assignee: Masonite Corporation, Tampa, FL (US)

( * ) Notice: Subject to any disclaimer, the term of this patent is extended or adjusted under 35 U.S.C. 154(b) by 517 days.

(21) Appl. No.: 17/670,861

(22) Filed: Feb. 14, 2022

(65) Prior Publication Data

US 2022/0263297 A1    Aug. 18, 2022

Related U.S. Application Data

(60) Provisional application No. 63/148,672, filed on Feb. 12, 2021.

(51) Int. Cl.
*E06B 1/52* (2006.01)
*E05D 11/00* (2006.01)
(Continued)

(52) U.S. Cl.
CPC .......... *E06B 1/528* (2013.01); *E05D 11/0081* (2013.01); *E06B 1/52* (2013.01);
(Continued)

(58) Field of Classification Search
CPC ... E05B 47/0001; E05D 11/0081; E06B 1/52; E06B 1/528; E06B 7/28; F21V 33/006; H02G 3/04
See application file for complete search history.

(56) References Cited

U.S. PATENT DOCUMENTS 612,192 A    10/1898   Chandler
615,209 A    11/1898   Baxter
(Continued)

FOREIGN PATENT DOCUMENTS

AU    2020101466 A4    8/2020
CN    200968110 Y    10/2007
(Continued)

OTHER PUBLICATIONS

International Search Report for International Application No. PCT/US2022/016303; Application Filing Date: Feb. 14, 2022; Date of Search: May 25, 2022, 4 pages.
(Continued)

*Primary Examiner* — Jessie T Fonseca
(74) *Attorney, Agent, or Firm* — IceMiller LLP

(57) ABSTRACT

An exterior, residential door system comprises an outer door frame adapted to be mounted within an exterior opening of a residence, an exterior residential door pivotally attached to the outer door frame, at least one electric device installed on the door, a main controller mounted to the door, an electric power supply unit operably associated with the door, and a wire harness integrated into the door for transmitting electric power and electrical signals between the electric device, the controller and the source of electric power. The main controller is configured to cooperate with the wire harness to supply power to the at least one electric device and to supply operating signals to the at least one electric device for operating the at least one electric device and to receive operational signals from the at least one electric device responsive to the operating signals.

18 Claims, 25 Drawing Sheets

(51) Int. Cl.
  *E06B 7/28* (2006.01)
  *H02G 3/04* (2006.01)
  *H02G 3/36* (2006.01)
  *E05B 47/00* (2006.01)
  *F21V 33/00* (2006.01)

(52) U.S. Cl.
  CPC .............. *E06B 7/28* (2013.01); *H02G 3/04* (2013.01); *H02G 3/36* (2013.01); *E05B 47/0001* (2013.01); *F21V 33/006* (2013.01)

(56) References Cited

U.S. PATENT DOCUMENTS

| | | | |
|---|---|---|---|
| 1,744,040 | A | 1/1930 | Elzer |
| 3,355,695 | A | 11/1967 | Overesch |
| 3,838,234 | A | 9/1974 | Peterson |
| 3,842,386 | A | 10/1974 | Suska |
| 3,848,361 | A | 11/1974 | Foster et al. |
| 3,857,625 | A | 12/1974 | Crane et al. |
| 3,860,312 | A | 1/1975 | Gordon, Jr. |
| 4,445,299 | A | 5/1984 | Lehikoinen et al. |
| 5,369,394 | A * | 11/1994 | Quirk ............ G08B 21/0216 361/170 |
| 5,690,501 | A | 11/1997 | Mader |
| 5,992,094 | A * | 11/1999 | Diaz ............ G01V 3/105 109/6 |
| 7,824,200 | B2 | 11/2010 | Bryla et al. |
| 8,156,671 | B2 | 4/2012 | Presley et al. |
| 8,169,169 | B2 | 5/2012 | Hass et al. |
| 8,337,039 | B1 | 12/2012 | Larkin |
| 8,354,914 | B2 | 1/2013 | Buckingham et al. |
| 8,448,382 | B2 | 5/2013 | Rodgers et al. |
| 8,505,169 | B2 | 8/2013 | Wood et al. |
| 8,772,970 | B2 | 7/2014 | Lambrou |
| 9,290,966 | B2 | 3/2016 | Hanchett, Jr. |
| 9,652,917 | B2 | 5/2017 | Johnson et al. |
| 9,704,320 | B2 | 7/2017 | Johnson et al. |
| 9,922,513 | B1 | 3/2018 | Hall et al. |
| 10,037,636 | B2 | 7/2018 | Ho et al. |
| 10,043,332 | B2 | 8/2018 | Scalisi et al. |
| 10,347,064 | B2 | 7/2019 | Kim et al. |
| 10,361,880 | B1 | 7/2019 | Marcinkowski et al. |
| 10,453,280 | B2 | 10/2019 | Kontturi |
| 10,664,688 | B2 | 5/2020 | Goulden et al. |
| 10,691,953 | B2 | 6/2020 | Johnson et al. |
| 10,733,823 | B2 | 8/2020 | Scalisi |
| 10,755,509 | B2 | 8/2020 | Saeedi et al. |
| 10,801,248 | B2 * | 10/2020 | MacDonald ............ E06B 1/10 |
| 10,803,685 | B2 | 10/2020 | Marcinkowski et al. |
| 10,818,118 | B2 | 10/2020 | Sivalingam et al. |
| 10,938,250 | B2 | 3/2021 | Ahmed et al. |
| 10,950,076 | B1 | 3/2021 | Hall et al. |
| 10,964,138 | B2 | 3/2021 | Geerlings et al. |
| 10,997,547 | B2 | 5/2021 | Hall et al. |
| 10,999,092 | B2 | 5/2021 | Marcinkowski et al. |
| 11,047,164 | B2 * | 6/2021 | MacDonald ............ E06B 1/32 |
| 11,174,666 | B2 | 11/2021 | Demele et al. |
| 11,244,523 | B1 | 2/2022 | Brady et al. |
| 11,248,410 | B2 | 2/2022 | Dreyer et al. |
| 11,286,712 | B2 * | 3/2022 | MacDonald ............ E06B 3/70 |
| 11,290,298 | B2 | 3/2022 | Marcinkowski et al. |
| 11,339,604 | B2 | 5/2022 | Dreyer |
| 11,346,141 | B2 | 5/2022 | Gregoriou |
| 11,346,150 | B1 | 5/2022 | Johnston |
| 11,352,812 | B2 | 6/2022 | Johnson |
| 11,373,471 | B2 * | 6/2022 | Anderson ............ H04B 1/04 |
| D957,688 | S | 7/2022 | Kim et al. |
| 11,388,373 | B2 | 7/2022 | Scalisi |
| 11,403,899 | B2 | 8/2022 | Zhang |
| 11,403,902 | B2 | 8/2022 | Ho et al. |
| 11,417,200 | B2 | 8/2022 | Hass et al. |
| 11,441,332 | B2 | 9/2022 | Johnson et al. |
| 11,532,192 | B2 | 12/2022 | Hass et al. |
| 11,536,078 | B2 | 12/2022 | Dreyer |
| 11,539,794 | B1 | 12/2022 | Weber et al. |
| 11,543,801 | B2 | 1/2023 | Hall et al. |
| 11,634,944 | B2 * | 4/2023 | MacDonald ............ E06B 1/10 52/212 |
| 11,639,625 | B2 * | 5/2023 | Chi-Hsueh ............ G06F 1/1681 49/334 |
| 11,655,669 | B2 | 5/2023 | Hutton et al. |
| 11,694,287 | B2 | 7/2023 | Marcinkowski et al. |
| 11,729,014 | B2 | 8/2023 | Marcinkowski et al. |
| 11,767,710 | B1 | 9/2023 | Johnston |
| 2010/0115853 | A1 * | 5/2010 | Gebhart ............ H02P 6/28 49/506 |
| 2011/0016971 | A1 * | 1/2011 | Yulkowski ............ E06B 7/28 73/493 |
| 2012/0073083 | A1 | 3/2012 | Staude |
| 2014/0001880 | A1 | 1/2014 | Herglotz et al. |
| 2014/0020295 | A1 | 1/2014 | Bonahoom et al. |
| 2014/0213073 | A1 | 7/2014 | Harvey |
| 2014/0267739 | A1 | 9/2014 | Ibsies |
| 2016/0163139 | A1 | 6/2016 | Kankkunen et al. |
| 2016/0322847 | A1 | 11/2016 | Geiszler |
| 2017/0040827 | A1 | 2/2017 | Weber |
| 2017/0306674 | A1 | 10/2017 | Soloski et al. |
| 2017/0358952 | A1 | 12/2017 | Butler et al. |
| 2019/0271186 | A1 | 9/2019 | Chen et al. |
| 2019/0333302 | A1 | 10/2019 | Kagnew et al. |
| 2020/0014552 | A1 | 1/2020 | Tan et al. |
| 2020/0082240 | A1 | 3/2020 | Heitmar |
| 2020/0349786 | A1 | 11/2020 | Ho et al. |
| 2020/0378172 | A1 | 12/2020 | Lerpard |
| 2021/0207419 | A1 | 7/2021 | Sorice et al. |
| 2021/0207420 | A1 | 7/2021 | Sorice et al. |
| 2021/0207421 | A1 | 7/2021 | Sorice et al. |
| 2021/0209878 | A1 | 7/2021 | Kim et al. |
| 2022/0155005 | A1 | 5/2022 | Lee et al. |
| 2022/0186543 | A1 | 6/2022 | Soderqvist |
| 2022/0263297 | A1 * | 8/2022 | Bodurka ............ E06B 7/28 |
| 2022/0351722 | A1 | 11/2022 | Mandry et al. |
| 2022/0392287 | A1 | 12/2022 | Shen |
| 2023/0062621 | A1 | 3/2023 | Cheung |
| 2023/0184022 | A1 | 6/2023 | Eliasson et al. |

FOREIGN PATENT DOCUMENTS

| | | |
|---|---|---|
| CN | 103606213 A | 2/2014 |
| CN | 104105248 A | 10/2014 |
| CN | 203925102 U | 11/2014 |
| CN | 205117039 U | 3/2016 |
| CN | 106761274 A | 5/2017 |
| CN | 106836990 A | 6/2017 |
| CN | 206309153 U | 7/2017 |
| CN | 206329255 U | 7/2017 |
| CN | 107191110 A | 9/2017 |
| CN | 107448128 A | 12/2017 |
| CN | 107575137 A | 1/2018 |
| CN | 107610390 A | 1/2018 |
| CN | 107643706 A | 1/2018 |
| CN | 206903524 U | 1/2018 |
| CN | 107705511 A | 2/2018 |
| CN | 107730687 A | 2/2018 |
| CN | 107747457 A | 3/2018 |
| CN | 107795255 A | 3/2018 |
| CN | 107829659 A | 3/2018 |
| CN | 108118987 A | 6/2018 |
| CN | 207458156 U | 6/2018 |
| CN | 108389290 A | 8/2018 |
| CN | 108399674 A | 8/2018 |
| CN | 108412359 A | 8/2018 |
| CN | 108442852 A | 8/2018 |
| CN | 108661486 A | 10/2018 |
| CN | 108756617 A | 11/2018 |
| CN | 108868508 A | 11/2018 |
| CN | 108915498 A | 11/2018 |
| CN | 108924015 A | 11/2018 |
| CN | 108952449 A | 12/2018 |
| CN | 109098543 A | 12/2018 |
| CN | 109138774 A | 1/2019 |
| CN | 109191617 A | 1/2019 |
| CN | 109191739 A | 1/2019 |

(56) References Cited

FOREIGN PATENT DOCUMENTS

| | | |
|---|---|---|
| CN | 109236134 A | 1/2019 |
| CN | 109236135 A | 1/2019 |
| CN | 109267837 A | 1/2019 |
| CN | 109472902 A | 3/2019 |
| CN | 208777869 U | 4/2019 |
| CN | 208966175 U | 6/2019 |
| CN | 110009782 A | 7/2019 |
| CN | 110264682 A | 9/2019 |
| CN | 209429913 U | 9/2019 |
| CN | 110409954 A | 11/2019 |
| CN | 110505182 A | 11/2019 |
| CN | 110531631 A | 12/2019 |
| CN | 209990389 U | 1/2020 |
| CN | 110778265 A | 2/2020 |
| CN | 111173404 A | 5/2020 |
| CN | 111270959 A | 6/2020 |
| CN | 111343432 A | 6/2020 |
| CN | 111441680 A | 7/2020 |
| CN | 211038390 U | 7/2020 |
| CN | 211124167 U | 7/2020 |
| CN | 111505947 A | 8/2020 |
| CN | 111540093 A | 8/2020 |
| CN | 211230090 U | 8/2020 |
| CN | 111653025 A | 9/2020 |
| CN | 111764747 A | 10/2020 |
| CN | 211692114 U | 10/2020 |
| CN | 211851423 U | 11/2020 |
| CN | 112096221 A | 12/2020 |
| CN | 112211496 A | 1/2021 |
| CN | 112267796 A | 1/2021 |
| CN | 112330869 A | 2/2021 |
| CN | 112491668 A | 3/2021 |
| CN | 112539020 A | 3/2021 |
| CN | 213205374 U | 5/2021 |
| CN | 112901047 A | 6/2021 |
| CN | 113048374 A | 6/2021 |
| CN | 113129476 A | 7/2021 |
| CN | 113338772 A | 9/2021 |
| CN | 113345130 A | 9/2021 |
| CN | 113545639 A | 10/2021 |
| CN | 113645446 A | 11/2021 |
| CN | 113674454 A | 11/2021 |
| CN | 113706744 A | 11/2021 |
| CN | 214835862 U | 11/2021 |
| CN | 214886488 U | 11/2021 |
| CN | 214943492 U | 11/2021 |
| CN | 215169563 U | 12/2021 |
| CN | 113947834 A | 1/2022 |
| CN | 217240775 U | 8/2022 |
| CN | 217307315 U | 8/2022 |
| CN | 115095246 A | 9/2022 |
| CN | 115164381 A | 10/2022 |
| CN | 115235096 A | 10/2022 |
| CN | 115294675 A | 11/2022 |
| CN | 115324428 A | 11/2022 |
| CN | 115341821 A | 11/2022 |
| CN | 115393988 A | 11/2022 |
| CN | 218454661 U | 2/2023 |
| CN | 115798084 A | 3/2023 |
| CN | 116251221 A | 6/2023 |
| CN | 219197192 U | 6/2023 |
| CN | 219246122 U | 6/2023 |
| CN | 116498183 A | 7/2023 |
| CN | 116760602 A | 9/2023 |
| CN | 117238059 A | 12/2023 |
| DE | 202022101334 U1 | 5/2022 |
| EP | 1837467 A2 | 9/2007 |
| EP | 3118405 A1 | 1/2017 |
| EP | 3537398 A1 | 9/2019 |
| EP | 3530848 A1 | 6/2021 |
| EP | 3845729 A1 | 7/2021 |
| FR | 3132160 A3 | 7/2023 |
| IN | 201921017138 A | 5/2019 |
| IN | 201911049967 A | 12/2019 |
| IN | 201911048995 A | 5/2021 |
| IN | 202111053824 A | 12/2021 |
| IN | 202241020116 A | 4/2022 |
| IN | 202241026843 A | 5/2022 |
| IN | 411059 B | 11/2022 |
| IN | 202111013824 A | 12/2022 |
| IN | 430120 B | 4/2023 |
| IN | 202341019331 A | 4/2023 |
| JP | H07-091152 A | 4/1995 |
| JP | 2008-014078 A | 1/2008 |
| JP | 2011-074562 A | 4/2011 |
| JP | 6680821 B2 | 3/2020 |
| JP | 2020042440 A | 3/2020 |
| JP | 6777955 B2 | 10/2020 |
| KR | 10-0666159 B1 | 1/2007 |
| KR | 20160025226 A | 3/2016 |
| KR | 20160050965 A | 5/2016 |
| KR | 20160123639 A | 10/2016 |
| KR | 20160124481 A | 10/2016 |
| KR | 101800514 B1 | 12/2017 |
| KR | 20180076537 A | 7/2018 |
| KR | 20180131716 A | 12/2018 |
| KR | 10-1942501 B1 | 1/2019 |
| KR | 101988851 B1 | 6/2019 |
| KR | 20190098719 A | 8/2019 |
| KR | 20190098720 A | 8/2019 |
| KR | 102024754 B1 | 9/2019 |
| KR | 102079532 B1 | 2/2020 |
| KR | 102150642 B1 | 9/2020 |
| KR | 20200143302 A | 12/2020 |
| KR | 20210004253 A | 1/2021 |
| KR | 20210016726 A | 2/2021 |
| KR | 20210019211 A | 2/2021 |
| KR | 20210019216 A | 2/2021 |
| KR | 20210019218 A | 2/2021 |
| KR | 20210019241 A | 2/2021 |
| KR | 20210045195 A | 4/2021 |
| KR | 20210072510 A | 6/2021 |
| KR | 20210078199 A | 6/2021 |
| KR | 102303254 B1 | 9/2021 |
| KR | 102329035 B1 | 11/2021 |
| KR | 102341883 B1 | 12/2021 |
| KR | 20210153308 A | 12/2021 |
| KR | 20220031428 A | 3/2022 |
| KR | 102421708 B1 | 7/2022 |
| KR | 20220113136 A | 8/2022 |
| KR | 20220119878 A | 8/2022 |
| KR | 102472384 B1 | 12/2022 |
| KR | 102554826 B1 | 5/2023 |
| TW | M627626 U | 6/2022 |
| WO | 2004067884 A1 | 8/2004 |
| WO | 2013163124 A1 | 10/2013 |
| WO | 2016032464 A1 | 3/2016 |
| WO | 2016175910 A1 | 11/2016 |
| WO | 2017024088 A1 | 2/2017 |
| WO | 2018184450 A1 | 10/2018 |
| WO | 2018184452 A1 | 10/2018 |
| WO | 2018184453 A1 | 10/2018 |
| WO | 2018184454 A1 | 10/2018 |
| WO | 2019068021 A1 | 4/2019 |
| WO | 2019162435 A1 | 8/2019 |
| WO | 2022004989 A1 | 1/2022 |
| WO | 2022010071 A1 | 1/2022 |
| WO | 2022010072 A1 | 1/2022 |
| WO | 2022010073 A1 | 1/2022 |
| WO | 2022010074 A1 | 1/2022 |
| WO | 2022020893 A1 | 2/2022 |
| WO | 2022145966 A1 | 7/2022 |
| WO | 2022263147 A1 | 12/2022 |
| WO | 2023180427 A1 | 9/2023 |

OTHER PUBLICATIONS

Written Opinion for International Application No. PCT/US2022/016303; Application Filing Date: Feb. 14, 2022; Date of Search: May 25, 2022, 6 pages.

Chilean Office Action for Chilean Application No. 202302369; Report Mail Date Aug. 5, 2024 (27 Pages—with Translation).

(56) References Cited

OTHER PUBLICATIONS

Notice of Preliminary Rejection in KR 10-2023-7030847, dated Apr. 2, 2025 (w/translation) [14 Pages].

* cited by examiner

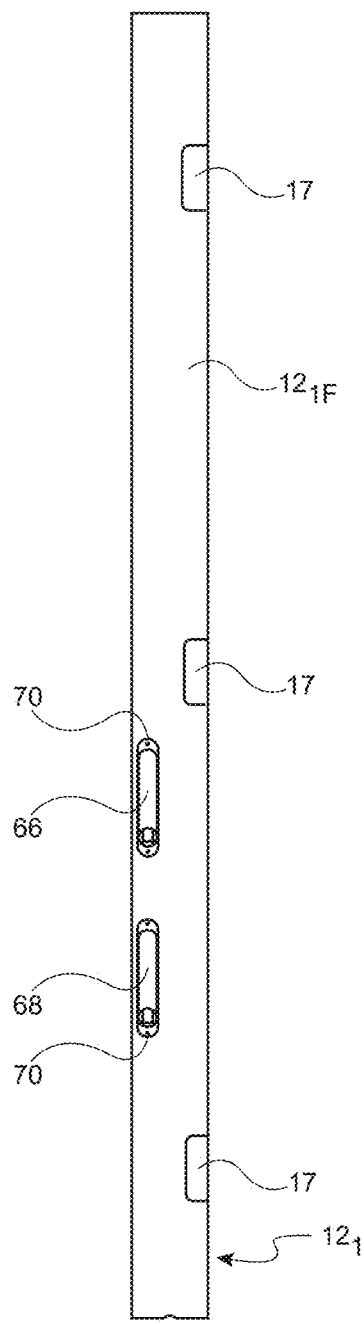
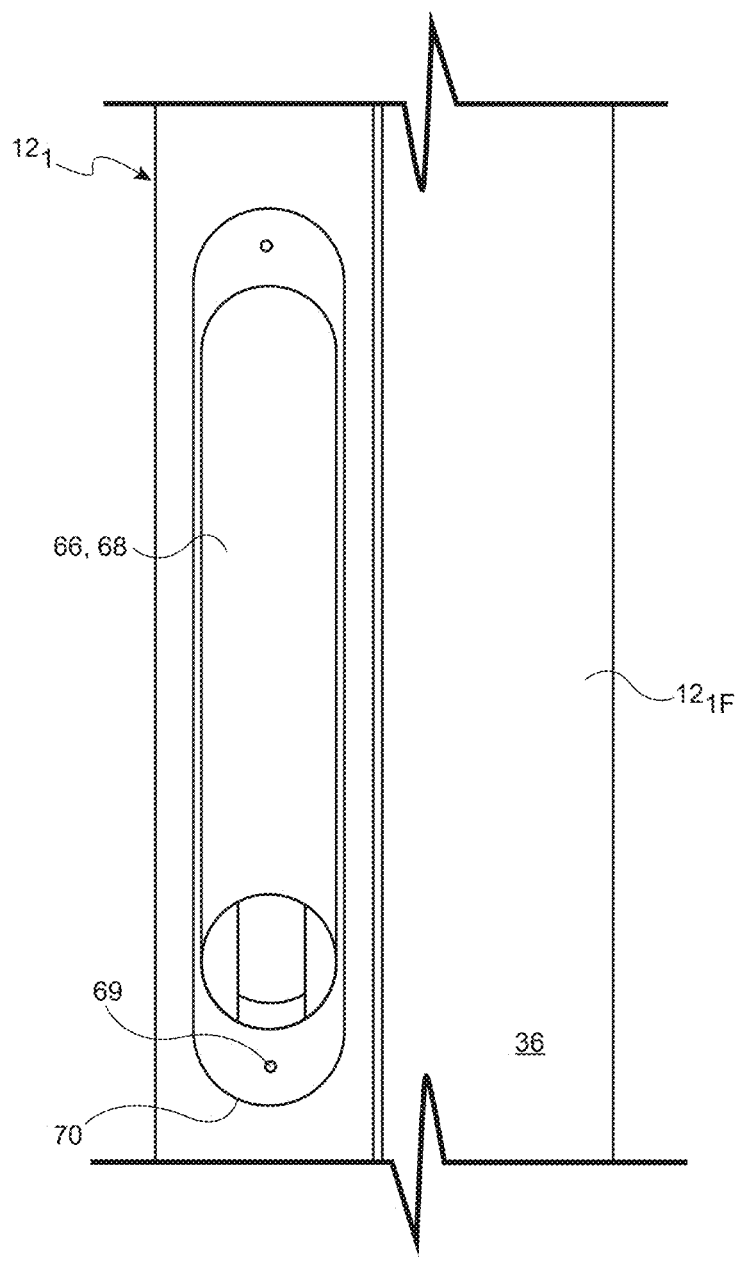
FIG. 4A
FIG. 4B

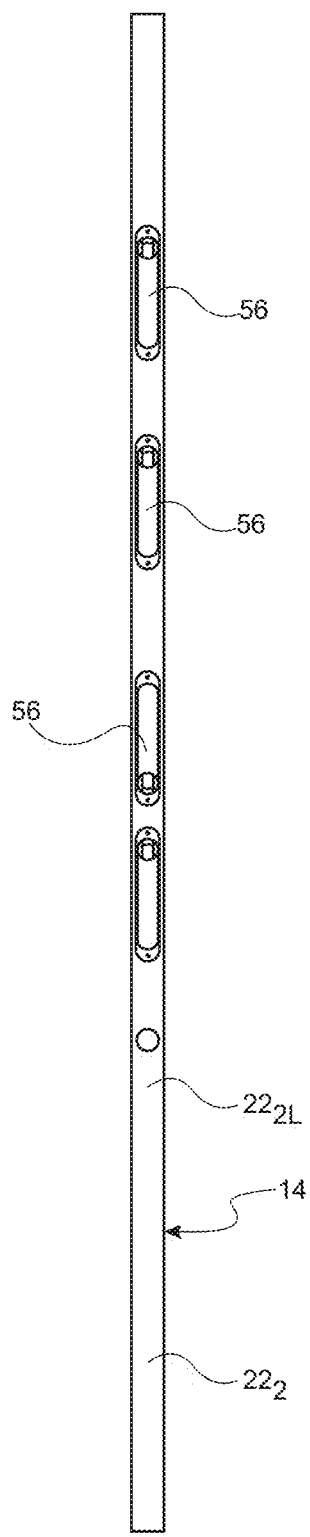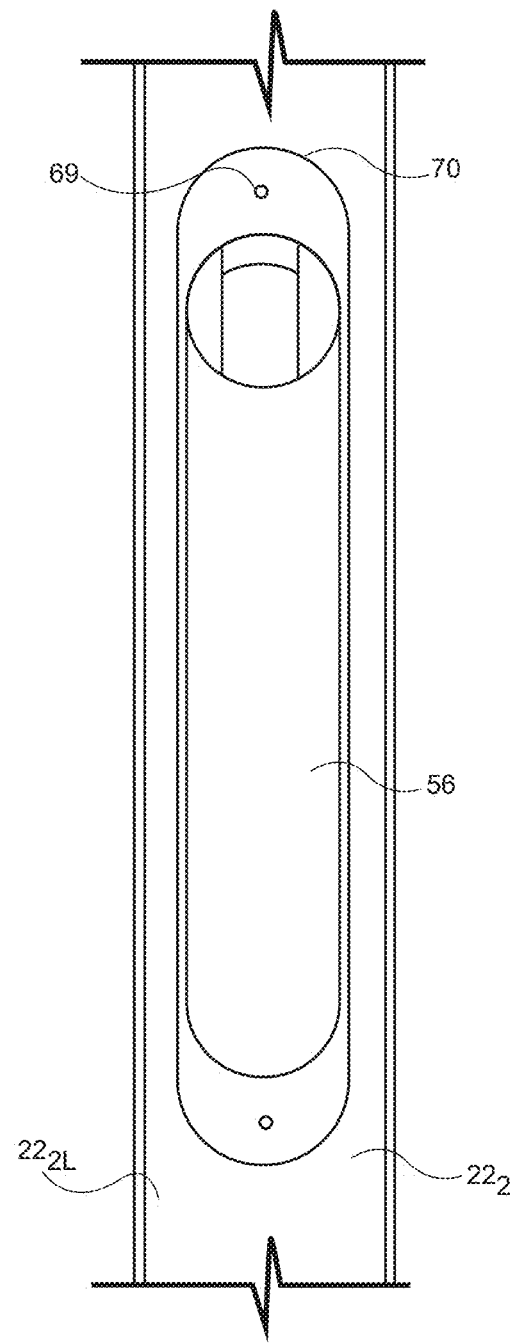
FIG. 6
FIG. 7

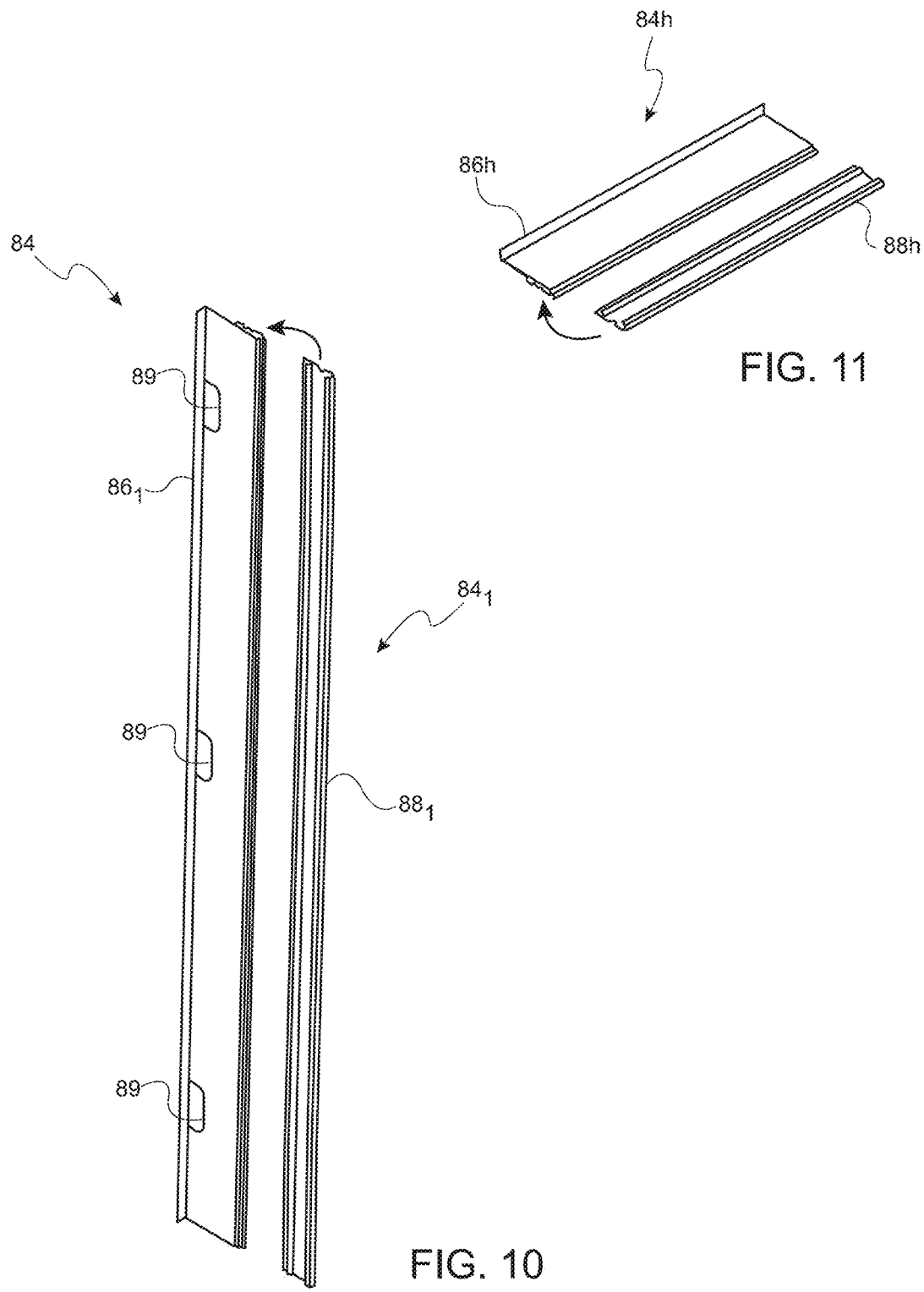

DOOR SYSTEM WITH WIRE HARNESS ROUTED INSIDE OF DOOR AND OUTER DOOR FRAME FOR CONNECTION WITH ELECTRIC DEVICES

CROSS-REFERENCE TO RELATED APPLICATION AND CLAIM TO PRIORITY

This Application claims the benefit of U.S. Provisional Patent Application Ser. No. 63/148,672 filed Feb. 12, 2021 by Bodurka et al., which is hereby incorporated herein by reference in its entirety and to which priority is claimed.

BACKGROUND OF THE INVENTION

1. Field of the Invention

The present invention is directed to exterior or interior doors for residential or commercial buildings, such as for a home, apartment, condominium, hotel room or business. More particularly the present invention is directed to a door system adapted to connect to sources of low- and/or high-voltage electrical power and/or a power/data management system, the door system having power/data/control wire harness running within a door and/or within a surrounding outer door frame to operate electric devices mounted to, or adjacent, the door system.

2. Description of the Related Art

Typical existing exterior or interior doors for residential or commercial buildings may have a number of electric devices (or components) mounted to the doors in order to provide desired functions, such as electronic access control, door state feedback, i.e., open/closed position vis-à-vis the jamb, an entry camera and/or audio communication, an electric powered door latch, an electric powered door lock, an auto open/close system, etc. Also, the market for exterior and interior doors has seen an increasing adoption of additional electric devices including video doorbells, smart locks, LED lighting, smart glass, fail safe electromechanical door closers, wireless connectivity electronics, etc. Each of these discrete electric and/or smart devices is typically an "add-on" to an existing installed door, functions within or on the existing door construction, and is usually powered separately with at least one battery that requires periodic replacement. Should the battery not be replaced, or charged regularly, then the electric device will not operate.

In addition, current electric devices are mounted to exterior or interior doors in a manner that can be unattractive and unpleasant to look at owing to respective design styles that are not compatible with the home décor or one with the other. The electric devices typically each have either one or more rechargeable battery packs or at least one non-rechargeable battery that must periodically be recharged or changed and have some type of weatherable housing that also may not initially match the appearance of the door and may fade or degrade in appearance over time.

While the commercial market, e.g., multi-tenant and mixed-use housing, hospitality, office, etc., has developed electrified door entry systems with electric strikes and door controller technologies, the adoption into the residential market has been limited. Existing residential door construction techniques focus on stile and rail construction and have not seen integration of power systems or integration of electric devices with an internal controller or "smart" door system.

Therefore, the need exists for a door system, and method, designed for integration of electric and smart devices into the door system, pre or post-installation, post-installation serviceability of those devices, with power and data run to the door or around the door, or both, so that electric and data centric devices can be powered and data managed by a control system and the devices may be easily integrated into and powered/controlled from a central power supply and command controller without adversely impacting structural integrity, insulation and/or acoustic performance, energy efficiency, and aesthetics of the door system. Thus, improvements that may enhance performance and cost of door systems with electric and data driven devices are made possible.

BRIEF SUMMARY OF THE INVENTION

According to a first aspect of the present invention, there is provided an exterior, residential door system. The door system comprises an outer door frame adapted to be mounted within an exterior opening of a residence, an exterior residential door pivotally attached to the outer door frame, at least one electric device installed on the door, a main controller mounted to the door, an electric power supply unit operably associated with the door, and a wire harness integrated into the door for transmitting electric power and electrical signals between the electric device, the controller and the source of electric power. The main controller is configured to cooperate with the wire harness to supply power to the at least one electric device and to supply operating signals to the at least one electric device for operating the at least one electric device and to receive operational signals from the at least one electric device responsive to the operating signals.

According to a second aspect of the present invention, there is provided an exterior, residential door system. The door system comprises an outer door frame adapted to be mounted within an opening of a residence, an exterior, residential door pivotally attached to the outer door frame, a DC power supply unit mounted in the outer door frame and configured to be electrically connected to an AC power unit disposed adjacent the outer door frame, a DC electric device mounted to the door or the outer door frame, at least one sensor mounted to or proximate the door, a main controller mounted to one of the door, the outer door frame, and proximate the door system, and a wire harness integrated into the door system for transmitting electric power and electrical signals between the main controller, the DC electric device, the at least one sensor, and the DC power supply unit. The DC power supply unit is configured to convert AC power to DC power and to step down the voltage of the DC power so that the DC voltage is less than the AC voltage. The main controller is configured to cooperate with the wire harness to supply DC power to the DC electric device and the at least one sensor, and to supply operating signals to the DC electric device in response to signals from the at least one sensor for operating the DC electric device and to receive operational signals from the DC electric device responsive to the operating signals.

According to a third aspect of the present invention, there is provided a method of manufacturing an exterior residential door for use with an outer door frame. The method comprises the steps of providing an inner door frame and a first door skin assembled thereon, positioning a wire harness about the conduit, positioning at least one foam dam in the conduit, the at least one foam dam sealing the conduit and the wire harness, positioning and securing a second door skin on an opposite surface of the inner door frame and thereby creating an opening between the door skins, introducing an expandable foam into the opening, and foaming the expandable foam within the opening and thus creating a door core. The inner door frame comprises stiles and rails and at least some of the stiles and rails having a conduit formed by channels on outer or inner edges thereof. The wire harness has a first end on an exterior surface of the door and a second end remote from the door. The foam dam prevents the expanding foam from entering the conduit and dislodging the wire harness.

Other aspects of the invention, including apparatus, devices, methods, and the like which constitute parts of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings:

FIG. 4A is an edgewise view of a hinge edge of a hinge side jamb member of an outer door frame according to the first exemplary embodiment of the present invention;

FIG. 4B is an enlarged edgewise view of a pocket location as shown in FIG. 4A;

FIG. 6 is an edgewise view of a hinge edge of a door in accord with the first exemplary embodiment of the present invention;

FIG. 7 is an enlarged edgewise view of the door as shown in FIG. 6;

FIG. 10 is a perspective exploded view showing a first wiring mounting device;

FIG. 11 is a perspective exploded view showing a header wiring mounting device;

DETAILED DESCRIPTION OF EXEMPLARY EMBODIMENTS

Figure 1:
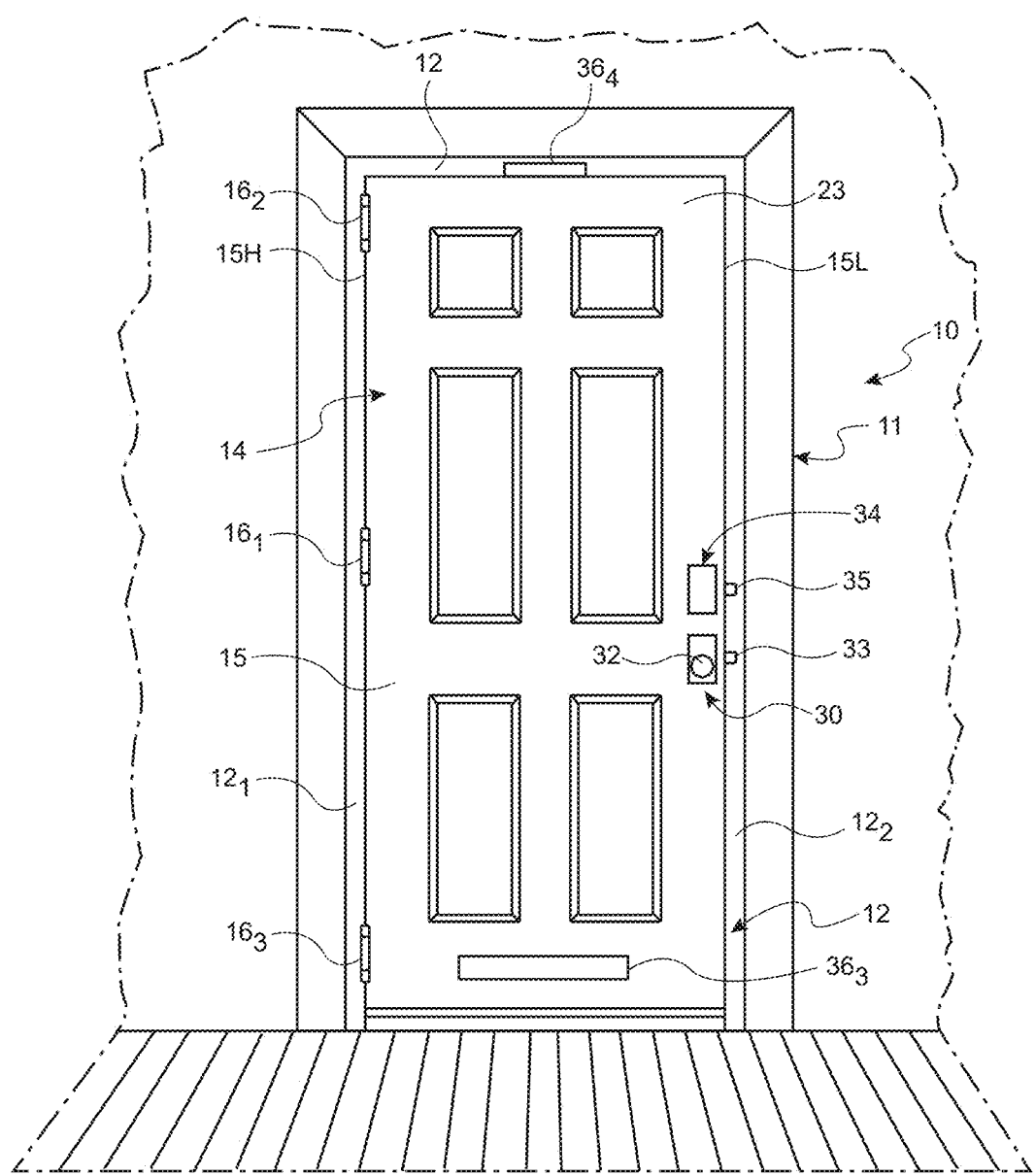
FIG. 1 is an elevational exterior view of an exterior door system according to a first exemplary embodiment of the present invention.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as "horizontal," "vertical," "front," "rear," "upper", "lower", "top" and "bottom" as well as derivatives thereof (e.g., "horizontally," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

Figure 2:
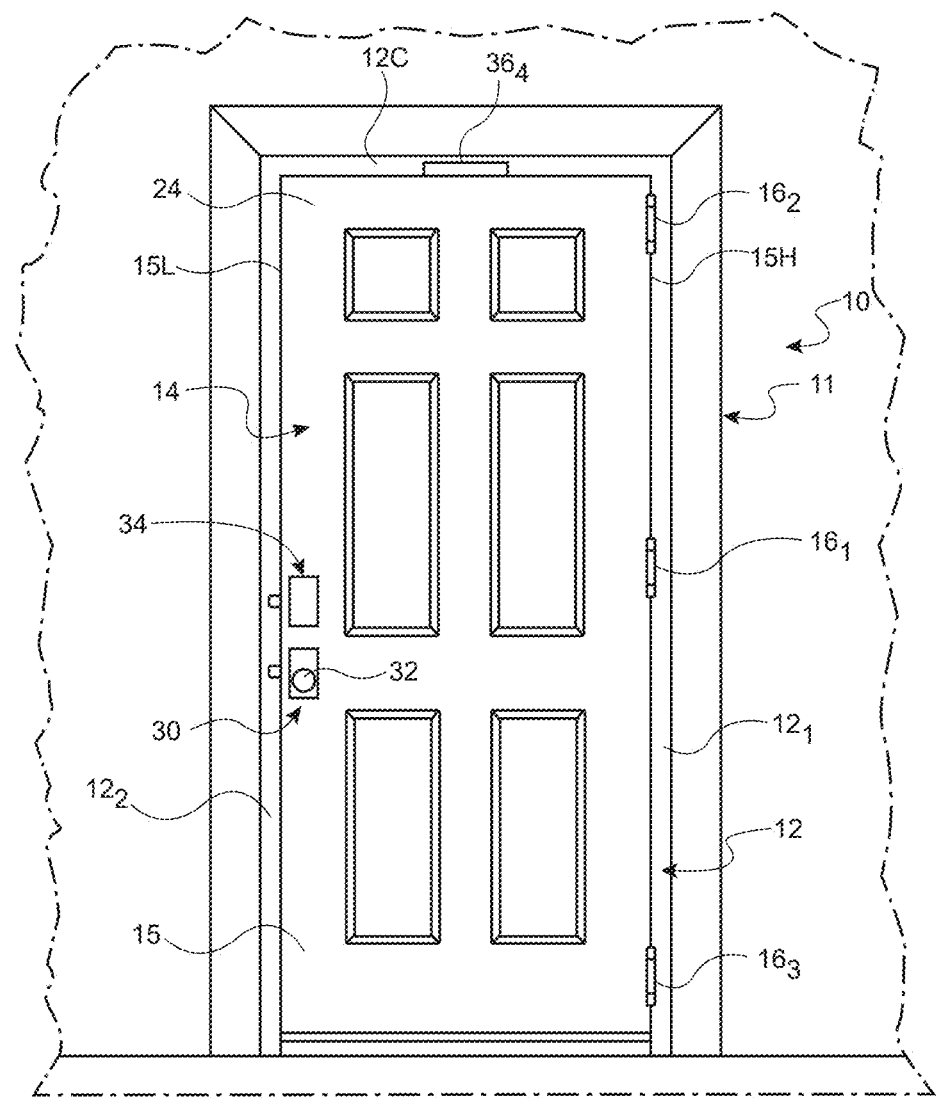
FIG. 2 is an elevational interior view of the door system according to the first exemplary embodiment of the present invention.

FIGS. 1 and 2 depict a door system 10 according to an exemplary embodiment of the present invention, such as a pre-hung exterior door pre-equipped with, or adapted to accept, smart and/or electrified component capability. That is, the door system 10 is "ready" for the separate or concurrent installation and connection of data and electrically operated devices associated with the door system. The door system 10 includes a conventional hinged residential exterior door assembly 11, but it should be understood that the door assembly 11 may be either an exterior or interior door assembly having a pivotal door provided for a residential or commercial building, such as a home, apartment, garage, condominium, hotel, office building, or the like. The door assembly 11 may be made of any appropriate material suitable for the purpose, such as wood, metal, wood composite material, fiberglass reinforced polymer composite or the like. The door assembly 11 includes a rectangular outer door frame 12 and a door 14 including a door slab 15 pivotally attached thereto by at least one hinge $16_1$, such as a "butt hinge" that includes two leaves.

The door slab 15 has a width preferably ranging between 2'6"-3'6" and a height ranging from 6'5" to 8'3". The door 14 may be a single door unit, a door with sidelites, a double door, a double door with sidelites, inswing or outswing door.

The outer door frame 12 includes first and second parallel, spaced apart vertically extending first (or hinge side) and second (or latch side) jamb members $12_1$ and $12_2$ and a horizontally extending upper jamb rail member or header $12h$ that connects upper ends of the first and second jamb members $12_1$, $12_2$. Those skilled in the art recognize that lower ends of the jamb members $12_1$, $12_2$ may be also interconnected through a threshold $12_t$. In view of the structural similarities of the first and second jamb members $12_1$ and $12_2$ and the header $12h$, and in the interest of simplicity, the following discussion will sometimes use a reference numeral $12m$ to designate an entire group of substantially identical jamb members.

The at least one hinge $16_1$ pivotally attaches the door slab 15 to the first jamb member (or hinge side jamb) $12_1$. Typically, at least two hinges $16_1$ and 162 are provided to secure the door slab 15 to the first jamb member $12_1$. Preferably, as best shown in FIG. 2, three hinges $16_1$, $16_2$, $16_3$ are used to secure the door slab 15 to the outer door frame 12. In the interest of simplicity, the following discussion will sometimes use reference numeral 16 without a subscript numeral to designate an entire group of hinges. For example, the reference numeral 16 will be sometimes used when generically referring to the hinges $16_1$, $16_2$ and $16_3$.

The door slab 15 may be for exterior or interior doors for residential or commercial buildings. The exemplary door slab 15 includes a rectangular inner door frame 20, an exterior door skin (or facing) 23, and an interior door skin (or facing) 24, with the door skins 23, 24 secured to opposite sides of the inner door frame 20, as best shown in FIGS. 1 and 2. As used herein "exterior" indicates the side of the door that faces away from a room or house; and "interior" indicates the side of the door slab 15 that faces the interior of a room or house. The door slab 15 has a hinge side 15H mounted to the inner door frame 20 by the hinges 16, and a horizontally opposite latch side 15L.

The inner door frame 20 includes a pair of parallel, spaced apart horizontally extending top and bottom rails $21_1$ and $21_2$, respectively, and a pair of parallel, spaced apart vertically extending first and second stiles $22_1$ and $22_2$, respectively, ordinarily manufactured from wood or an engineered wood, such as a laminated veneer lumber (LVL). These rails and stiles could also include weather resistant coatings or caps, such as PVC, to help prevent rot and environmental damage in the field. The top and bottom rails $21_1$ and $21_2$ horizontally extend between the first and second stiles $22_1$ and $22_2$. Moreover, the top and bottom rails $21_1$ and $21_2$ may be fixedly secured to the first and second stiles $22_1$ and $22_2$, such as through adhesive or mechanical fasteners. The inner door frame 20 further may include a mid-rail extending horizontally and spaced apart from the top and bottom rails $21_1$ and $21_2$, respectively, and is typically also manufactured from wood or an engineered wood, such as a laminated veneer lumber (LVL). Moreover, the mid-rail may be fixedly secured to the first and second stiles $22_1$ and $22_2$. The hinges 16 are secured to the first stile $22_1$, which defines a hinge stile of the inner door frame 20. The construction of the stiles and rails allow for the door slab to be trimmable to size without the need to rewire or move any electric components, in the field or at an operations facility.

The inner door frame 20 and the exterior and interior door skins 23, 24 of a typical door surround an interior cavity, which may be hollow or may be filled with, for example, corrugated pads, foam insulation, or other core materials, if desired. Thus, the door slab 15 may include a core 18 disposed within the inner door frame 20 between the exterior and interior door skins 23 and 24. The core 18 may be formed from foam insulation, such as polyurethane foam material, cellulosic material and binder resin, corrugated pads, etc.

The door system 10 further comprises a number of DC (i.e., direct current) electric components (devices) mounted to the door slab 15 itself, the outer door frame 12 or adjacent the door slab 15 and the outer door frame 12 of the door system 10 to provide functions, such as electronic access control, door state feedback sensor(s), entry camera, ambient light sensor, and audio/video communication, etc. The electric devices that may be mounted to the smart ready door 14 of the door system 10 include, but are not limited to, an electric power door lock 34, a video doorbell $36_1$, a digital camera $36_2$, a threshold LED light $36_3$, and an ambient light sensor 37, while a door face illumination LED light $36_4$ may be mounted to the outer door frame 12, such as the header 12h of the outer door frame 12 as illustrated in FIGS. 1 and 3.

Figure 3:
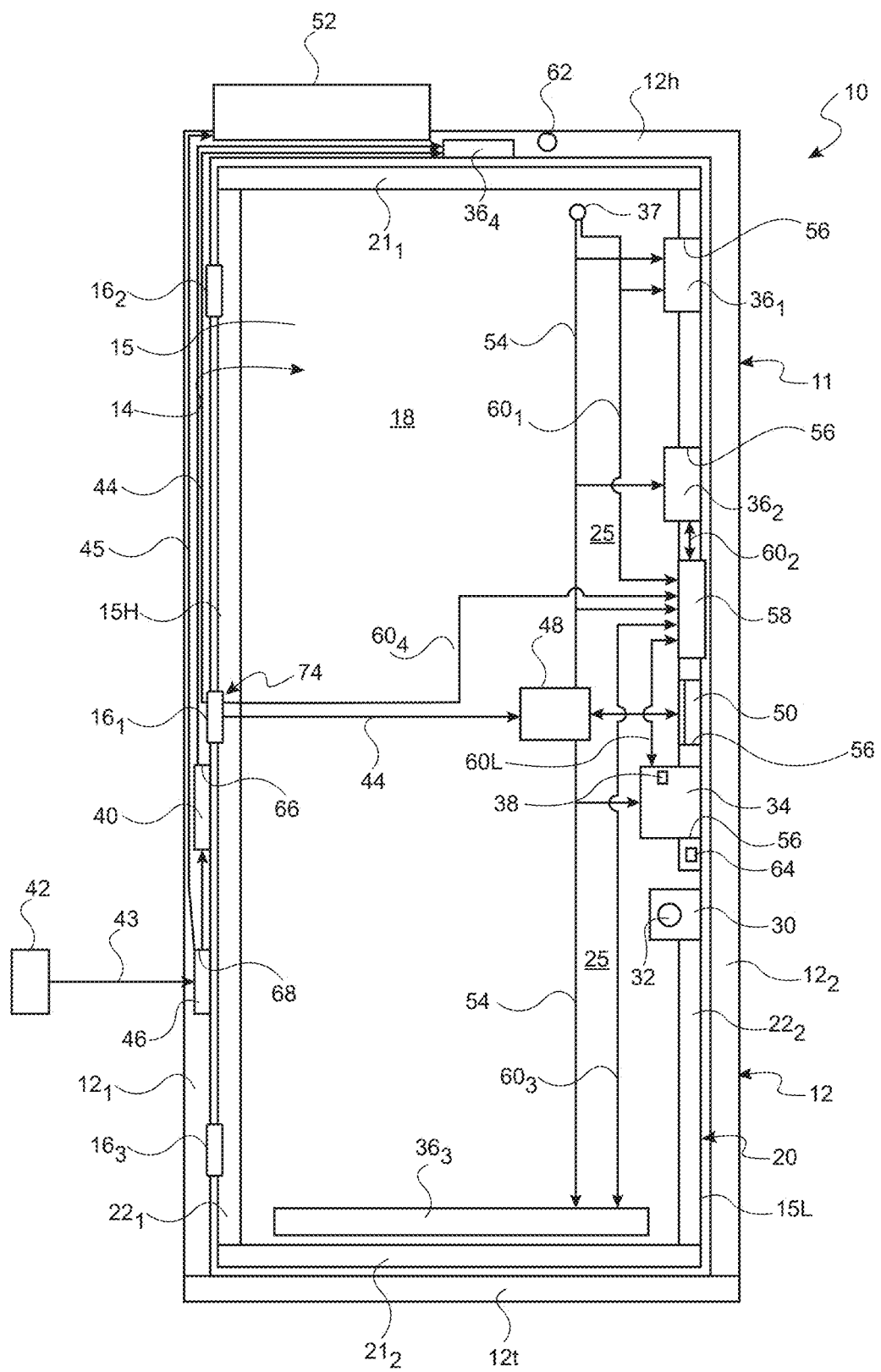
FIG. 3 is an elevational view of the door system according to the first exemplary embodiment of the present invention without an exterior door skin in order to allow observation of the interior of the door and the smart ready functionality contained therein.

Also, the electric power door lock 34 is to be mounted to the inner door frame 20 of the door slab 15, while the video doorbell $36_1$, the digital camera $36_2$, the threshold LED light $36_3$ and the door face illumination LED light $36_4$ may be mounted to the outer door frame 12 or to the door slab 15 of the door system 10, as best illustrated in FIG. 3. Alternatively, the video doorbell $36_1$, the digital camera $36_2$, the threshold LED light $36_3$ and/or the door face illumination light $36_4$ may be mounted to the outer door frame 12 or even adjacent to the outer door frame 12 on a wall of the building. The threshold LED light $36_3$ and/or the door face illumination light $36_4$ may illuminate when an authorized person is recognized or when a person approaches the door 14. Further, while we illustrate a single LED light $36_4$ in FIGS. 1-3, the door system may include multiple LEDs, such as to illuminate the door system 10, to illuminate the electric powered lock 34, and to illuminate a door handle. Thus, three or more LEDs may be provided on or adjacent the door 14.

The DC electric devices 361-364 typically are low-voltage DC electric devices operated by low-voltage DC electrical power. Low voltage direct current (DC) is known in the art as 50 volts (V) or less. Common low voltages are 5 V, 12 V, 24 V, and 48 V. Preferably, the low-voltage DC electric devices $36_1$-$36_4$ are operated by the 12 VDC/3 A low-voltage DC electrical power. Low voltage/current is normally used for doorbells, video doorbells, garage door opener controls, heating and cooling thermostats, alarm system sensors and controls, outdoor ground lighting, household, and automobile batteries. Low voltage/current (when the source is operating properly) will not provide an aggressive shock from contact. Whereas a high current/voltage short circuit (automobile battery) can cause an arc flash and possible burns.

The door system 10 according to the present invention may include other electric devices, as there are a number of electric devices marketed to be mounted to doors and provide functions such as electronic access control, door state feedback, entry camera and communication, etc. In the interest of simplicity, the following discussion will sometimes use a reference numeral without a subscript numeral to designate an entire group of the electric devices. For example, the reference numeral 36 will be sometimes used when generically referring to the electric devices 361-364.

The door 14 of the door system 10 further includes a door latch 30. As best illustrated in FIGS. 1 and 2, the door latch 30 includes a door handle 32, such as doorknob or door lever, and a bolt 33 moveable between extended and retracted positions. The door handle 32 is manually operable by a user to retract the bolt 33 to allow opening of the door 14 from a closed position to an open position. Alternatively, the door handle 32 of the door latch 30 may be operable remotely, electrically, or touchless by a user. As best illustrated in FIGS. 1-3, the door latch 30 is mounted to the latch side 15L of the door slab 15. Specifically, the electric powered door latch 30 is mounted to the second stile $22_2$, which defines a latch stile of the inner door frame 20. The door latch 30 may, for example, have a lighted doorknob (or handle) 32 and a lighted keyhole, which is illuminated when an authorized person is recognized or when a user approaches.

As further illustrated in FIGS. 1 and 2, the electric power door lock 34 is in the form of a deadbolt device, although other power locking systems may be utilized. The electric power door lock 34 includes a deadbolt 35 operable between an extended or locked position, which prevents opening of the door 14, and a retracted or unlocked position, which allows opening of the door 14, and a lock state sensor 38. As best illustrated in FIGS. 1-3, the electric power door lock 34 is mounted to the latch side 15L of the door slab 15. Specifically, the electric power door lock 34 is mounted to the second stile $22_2$, i.e., the latch stile of the inner door frame 20.

Moreover, the door system 10 may also include, for example, a power door operator (such as an electric power door opener/closer) 52 associated with the outer door frame 12 and operably connected to the door slab 15. According to the embodiment, the power door operator 52 and a motion sensor (or motion detector) 62 are mounted to the outer door frame 12, while a door state sensor 64 is mounted to the inner door frame 20. The door state sensor 64, such as a reed switch sensor, determines whether the door 14 is open or closed. The reed switch sensor 64 is embedded in the latch stile $22_2$ of the inner door frame 20 and a magnet is embedded in the second jamb member (or latch side jamb) $12_2$ of the outer door frame 12. Alternatively, the door state sensor 64 may be located on any portion of the door slab 15 or the outer door frame 12, and the corresponding trigger, i.e. the magnet, may be located opposite wherever that sensor is located. Mechanical sensors may also be used. The door state sensor 64 may contemplate various "states" of the door or the door devices, i.e., locked/unlocked, open/closed, etc. According to the present invention, the AC powered door closer 52 and the door state sensor 64 interact to close the door 14 when the door state sensor 64 determines that the door 14 is open. Also, the door state sensor 64 monitors if the door 14 is ajar or closed (i.e., if the door 14 is properly aligned with the outer door frame 12) prior to activating the power door lock 34.

Any sensor used in the invention is preferably suitably sealed to protect against water/dust ingress, for example, any installed peephole ferrule pulls tight to the door skin of the door 14. Wood screws may also keep the sensors tight to the front or sides of the door 14.

The power door operator 52, in the first exemplary embodiment, has an articulating arm which has one end connected to a motor-carrying body attached to the header 124 and another end engaged with the door slab 15, so that operation of a motor of the power door operator 52 causes the articulating arm to articulate and pivot the door 14 to the open or closed position, as desired. The power door lock 34 is operated at low-voltage DC electrical power, while the electric door operator 52 is typically operated by AC electrical power, such as of 120 volts AC, but may also be powered off of low-voltage DC.

Figure 5A:
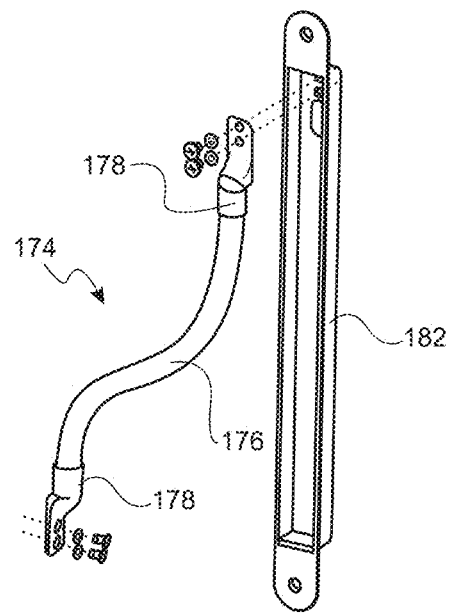
FIGS. 5A and 5B show an electric power transfer device.

As illustrated in FIG. 3, the door system 10 further comprises an AC distribution unit 46 and a DC power supply unit (PSU) 40 that includes a power converter, such as a low-voltage (such as 5 volts (V), 12 volts, 24 volts or other required voltage, preferably 12 VDC/3 A) AC to DC (AC/DC) converter, both shown mounted to the outer door frame 12. As best illustrated in FIG. 3, the PSU 40 is located, in the first exemplary embodiment, in the first jamb member $12_1$ of the outer door frame 12, which is adjacent to one of the hinges 16 and the first stile $22_1$ of the inner door frame 20, i.e., adjacent to the hinge side 15H of the door slab 15. Preferably, the PSU 40 and the AC distribution unit 46 are located and securely mounted (i.e., without rattling or moving within the door slab 15) in pockets (or slots) 66 and 68, respectively, machined or otherwise formed in the hinge side jamb $12_1$ of the outer door frame 12, as best shown in FIG. 5A, or, alternatively, in the header 12h of the outer door frame 12. Further alternatively, the PSU 40 and the AC distribution unit 46 may be located elsewhere on the outer door frame 12 or adjacent the outer door frame 12.

FIGS. 4A and 4B show a hinge edge (or front side) $12_{1F}$ of the first jamb member $12_1$ of the outer door frame 12 with mortises 17 for accepting respective hinge leaf elements. Each of the pockets 66 and 68 is provided with a trim mortise (or recess) 70 (best shown in FIG. 4B) to accept a cover plate of the PSU 40 or the AC distribution unit 46, when not in use, or an installation bracket for the installed PSU 40 or AC distribution unit 46, with mounting holes 69 for either the installed device 40 or 46, or the cover plate.

The PSU 40 is shown here electrically connected by high voltage wires 43 to an AC power unit 42 (i.e., 85-265 VAC 50/60 Hz) installed during home construction or located adjacent the door assembly 11. The PSU 40 may, for example, be located at a standardized height on the first jamb member $12_1$ of the outer door frame 12 so that the AC power unit 42 may be conveniently pre-installed during home construction. Due to their close proximity, the PSU 40 and AC power unit 42 may be easily electrically connected. Alternatively, the low voltage PSU 40 may be located outside the door assembly 11, such as within the wall adjacent the outer door frame 12. The AC power unit 42 provides a source of high voltage (e.g., 120 (or 110) volts of a standard general-purpose alternating-current (AC) electrical power supply or a high voltage electrical power supply) disposed outside but adjacent to the door system 10. Typically, the standard 120 (or 110) volts general-purpose AC electrical power supply is known in the USA as grid power, wall power, or domestic power. Other voltages, such as 85-265 VAC 50/60 Hz, may be used. The PSU 40, after connection to the AC power unit 42, converts the standard general-purpose alternating-current (AC) high voltage of 120 VAC 60 Hz to the safe low voltage of 12 VDC/3 A, or other required voltage. Many electric devices operate at 5 volts DC or 12 volts DC, so the PSU 40 steps down the power and converts the current type to allow typical 120 (or 115) volts general-purpose AC electrical power to be available for use at the door system 10.

The PSU 40 is electrically connected to the door 14 through an electric power transfer (EPT) device 74. In this embodiment, low voltage power supply electrical wires 44 run from the low voltage PSU 40 to the EPT device 74, such as through one of the hinges $16_1$, $16_2$, $16_3$. The low voltage power supply electrical wires 44 may run to and through the hinge $16_1$ disposed usually in the middle of the first jamb member $12_1$ of the door frame 12 and provide an electric powered (or electric transfer) hinge that conducts the low voltage electrical power therethrough. The low voltage power supply electrical wires 44 transfer electric power across or through the electric powered hinge $16_1$, to the door 14, which may be a McKinney Assa Abloy Electric Transfer Hinge with ElectroLynx® or the like. Other exemplary electrical hinges are disclosed in U.S. Pat. Nos. 3,860,312, 3,857,625, 3,842,386, 3,838,234, 3,355,695, 1,744,040, 615, 209, 612,192 and US published patent application No. 2017/0306674, 2014/0213073, 2014/0001880, 2012/0073083, the complete disclosures of which are incorporated herein by reference. In addition to provide power, the EPT device 74 may also house wires used to send data and electrical signals between devices mounted to the door slab 15, the door frame 12 or disposed outside the door assembly 11.

Figure 5B:
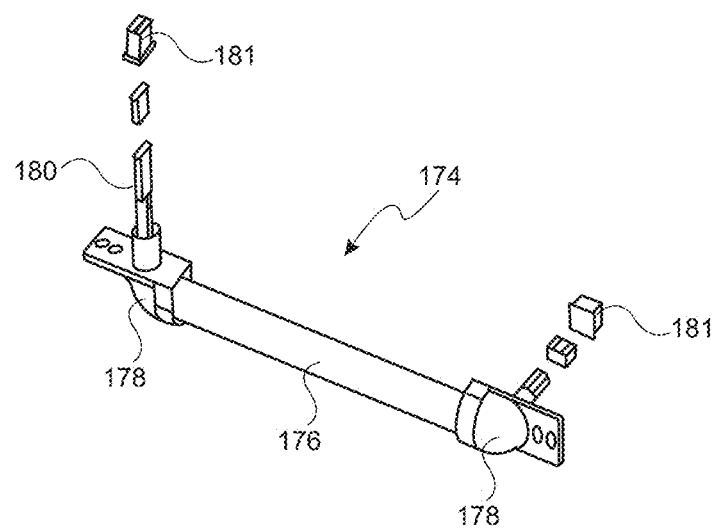
Figure 9:
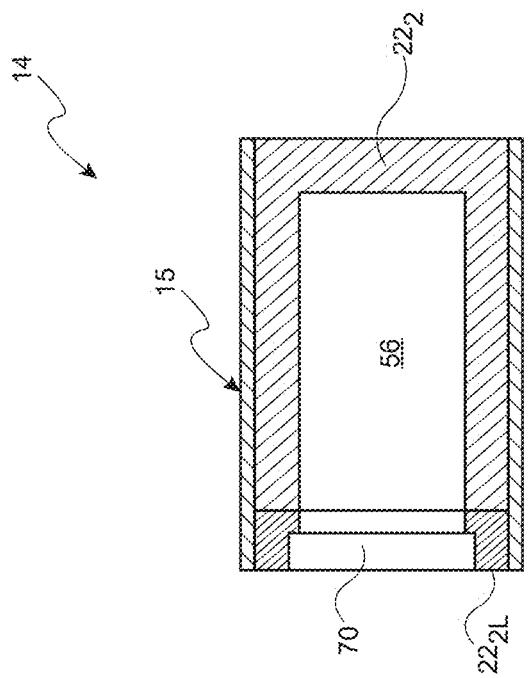
FIG. 9 is a sectional view of the door pocket shown in FIG. 8.

Alternatively, an EPT 174 according to an alternative embodiment of the electric power transfer device of the present invention, illustrated in FIGS. 5A and 5B, could be used. The EPT 174 includes a flexible tube 176, end members 178 secured to opposite distal ends of the flexible tube 176, and an electrical box 182 configured to house the flexible tube 176. The flexible tube 176 is configured to be located in the electrical box 182 mounted in the pocket 66 formed in the hinge edge $12_{1F}$ of the hinge side jamb member $12_1$ when the door 14 is closed, enabling the door 14 to swing open, and when shut conceal and protect the EPT 174 within the electrical box 182 in the hinge side jamb $12_1$. Alternatively, the electrical box 182, mounted in the pocket formed in a hinge edge of the hinge stile $22_1$ of the door slab 15, enables the door 14 to swing open, and when shut conceal and protect the EPT 174 within a recess in the hinge stile $22_1$ of the door slab 15. One of the end members 178 is attached to the electrical box 182 in the hinge side jamb $12_1$ of the door frame 12 and the other end member 178 is attached to the door slab 15. The flexible tube 176 houses electric power and signal (or data) wiring (or wire harness) 180 having terminal connectors 181. The flexible tube 176 of the EPT 174 runs from the door frame 12 to the door 14.

The term "wire harness", often referred to as a cable harness or wiring assembly, is known to those skilled in the art as a prefabricated assembly (or organized set) of electrical wires for transmitting electrical signals (data) or electrical power, which are bundled together with insulating material to keep the electrical wires organized. The wire harness has electrical terminals (or terminal connectors) configured to be attached to elements of an electrical system. The wire harness simplifies the connection to electrical components by integrating the wiring into a single unit for "drop-in" installation The electric wire harness 180 is configured to provide power from the PSU 40 to the electric devices mounted to the door 14 or the door frame 12 of the door assembly 11, and to send electrical signals (or data) between the electric devices mounted to the door 14, the door frame 12 or disposed outside the door assembly 11. The electric wire harness 180 has a first end on an exterior surface of the door 14 and a second end remote from the door 14.

Other exemplary electric power transfer devices with electrical flexible tubes are disclosed in U.S. Pat. Nos. 3,848,361, 4,445,299, 5,690,501, 8,448,382 and 8,505,169, the complete disclosures of which are incorporated herein by reference.

The power supply electrical wires 44 are connected, in the embodiment shown in FIGS. 1-3, to the powered hinge $16_1$ on the hinge side 14H of the door 14 and preferably run through a horizontal supply channel to a DC power/data distribution system 48, such as provided by an electrical distribution block, located in or adjacent to a vertical supply passage on the latch side 14L of the door 14. The DC power distribution system 48 transmits low voltage DC power, data, electrical signals, or a combination thereof. According to the first exemplary embodiment, the DC power distribution system 48 is disposed in a pocket (or slot) machined or otherwise formed into the stiles 22 of the inner door frame 20. Electric power can be delivered from the DC power distribution system 48 to the electric devices 36, such as devices $36_1$ and $36_2$ that are mounted to the door 14, specifically into the latch stile $22_2$. It may also deliver power, data, electrical signals to devices mounted to the door frame 12 or disposed outside the door assembly 11.

In this way, the 120 V AC power is distributed by the AC distribution unit 46 to the PSU 40 mounted in the door frame 12, and to at least one other electric device mounted into or on the frame assembly 12, such as the electric power door operator 52, through a high-voltage supply wire 45, shown in FIG. 3.

Low-voltage DC electrical power is delivered from the power distribution system 48 to the electric power door lock 34 and the electric devices $36_1$-$36_3$ that are mounted to the door slab 15. In addition, the low-voltage DC electrical power is delivered from the PSU 40 directly to the low-voltage electric device $36_4$ that is mounted to the frame assembly 12 by the low-voltage power supply wire 44 so as to bypass the door located DC power distribution system 48, as shown in FIG. 3.

A plurality of connecting electrical wires, i.e., pre-installed power and data wiring or wiring harness, extends through a vertical supply passage within the door slab 15 and electrically connects the DC power distribution system 48 to the electric power door lock 34 and the electric powered devices $36_1$-$36_3$, thus electrically connecting the electric power door lock 34, and the electric devices $36_1$-$36_3$ to the PSU 40, as best shown in FIG. 3. Alternatively, electrical connectors may be pre-mounted in the vertical supply passage at desired locations, so that the electric devices 36 may simply be inserted and plugged into pre-installed pockets with pre-positioned electrical connectors. A standard flange size and plug location relative to location of a flange of the electric devices 36 may be set so that suppliers may supply electric devices that are easily plugged into the door 14. The power supply electrical wires 44 and the plurality of the connecting electrical wires 54 together define an electrical wire system (or power and data wiring), which is disposed within the door 14 and is electrically connected to the PSU 40 and to the DC electric device 34 and 36.

In the event the electric devices 36 have connectors for connection to the DC power distribution system 48, the connectors may have a flange or some other unique identifier to mate with a complementary receptacle in order to identify or designate the connector and thus its electric device 36 as approved for use with the door system 10. Alternatively, the electric devices 36 may have an electronic signature or some other identifier to assure that the electric device 36 is approved/compatible for installation. Yet alternatively, a digital certificate may be provided for the electric device 36 for authentication when the door assembly 10 is initially activated. The digital certificate, when authenticated, establishes that the electric device 36 is approved for installation on the door system 10. A software handshake is another verification mechanism that may be utilized for electric devices 36. While plug connectors may be utilized to connect the electric devices 36, other forms of electrical connectors may be used while assuring transfer of power, data and operating signals.

The door 14 according to the first exemplary embodiment allows easy integration of the electric devices 36, while maintaining structural, insulation, noise attenuation, and aesthetic requirements of the door 14. Moreover, according to the first exemplary embodiment, a number of door edge slots (or pockets) 56, such as of up to 1.188" in width, are machined into latch side edge $22_{2L}$ of the latch side stiles $22_2$ to allow secure mounting (i.e., without rattling or moving within the door slab 15) of the electric devices $36_1$-$36_3$ or other electric devices, such as the power door lock 34, as best shown in FIGS. 3 and 4-9. Alternatively, some of the door edge slots 56 for mounting of the electric devices may be machined into the hinge side stile $22_1$. While the door edge slots 56 opening into the respective latch side stiles $22_2$ are shown, the slots 56 may also or alternatively open on the respective door facings 23, 24. For example, the slot 56 configured to receive the power door lock 34 and the doorbell $36_1$ are open also on the exterior door facing 23.

The connecting electrical wires 54 may be run to the DC power distribution system 48 or connectors, and may be pre-mounted to the first and second stiles $22_1$ and $22_2$, and the top rails $21_1$, thus allowing the power door lock 34, the electric devices 36, the ambient light sensor 37, the motion detector 62 and the door state sensor 64 to be plugged-in so that electric power, data, and/or signals can be supplied for use and functioning of the electric devices 34, 36 and the sensors 37, 62, 64.

As illustrated in FIG. 3, the door system 10 further includes a low-voltage back-up battery (or battery pack) 50 mounted to the door slab 15, such as to the inner door frame 20, and electrically connected to the power door lock 34 and the electric devices 36 as a back-up power supply. Preferably, the back-up battery 50 slides into one of the door edge slots 56 formed in one of the stiles (e.g., the second stile $22_2$) of the inner door frame 20 or alternatively in the opposed stile in pocket 68, and be similarly connected via the wire harness 54. If a door edge slot 56 is for the battery 50, for example, the door edge slot 56 could be—metal on one side and insulation on the other, to allow heat to sink off the battery 50 and insulate it from exterior temperatures. The battery 50 may be equipped with a temperature sensor and heater which allows the system to keep the battery in a stable temperature range when exposed to extreme or low temperatures. When power is lost, the pre-heated battery automatically provides power until AC power is restored.

FIGS. 3-9 illustrate the pockets 56, 66, 68 for accepting an electric device (power supply, controller, sensors, camera, etc.) around the periphery of the door slab 15. The machined or otherwise formed pockets 56, 66, 68 are contained within the latch side stiles $22_2$ of the door slab 15.

The battery 50 is electrically connected to the DC power distribution system 48. The battery 50 has a low nominal voltage (such as 5 volts (V), 12 volts or other required voltage). The nominal voltage of the back-up battery 50 corresponds to the output voltage of the PSU 40. The door system 10 may be powered and operated by the electric power of the battery 50 as a secondary back-up electrical power source for all of the powered devices in and/or around the door 14, for example, power door lock 34 and the electric devices $36_1$-$36_4$. Preferably, the battery 50 is also connected to the DC power distribution system 48 for back-up power, as well as to provide additional amperage for momentary, high amperage devices such as the power door lock 34. Preferably, the battery 50 is a rechargeable battery that is charged from the DC power distribution system 48. Thus, in the door system 10, the reliance on batteries as a primary power source is less important, but if a battery option is used as a primary or only power source, a larger consolidated battery 50 may be stored in the door 14 and not separately in each of the electric devices.

As illustrated in FIG. 3, the door 14 of the door system 10 also includes a main controller (or central electronic control unit (ECU), or power management controller) 58 configured to be programmed to receive input from one or more sensors, such as the motion sensor (or motion detector) 62 (in wireless communication with the main controller 58), a proximity sensor, a smoke detector, and the like and send commands to the electric devices $36_1$-$36_4$, the electric powered door latch 30, and also to the homeowner. The main controller 58 sends commands to the electric devices 34 and/or $36_1$-$36_4$, and also to the homeowner. The main controller 58 preferably is an electronic controller having firmware and/or associated software suitable for assuring operation of the main controller 58 and its interaction with the electric devices 36 and associated sensors, if any. Similarly, one or more sensors may be provided to not only turn-on the LED light(s) but allow the electric power door lock 34 to lock after determining that an individual has passed through the door 14 and the door 14 is closed, to communicate with a smartphone app to allow the owner to monitor activity around the door 14, to determine the status of the door 14, whether open or closed, and to determine whether someone is approaching the door 14.

The main controller 58 is also a logic controller (i.e., is responsible for controlling the different features like LED lighting and connecting to the cloud thus indirectly connected to the app). The main controller 58 is electrically connected to the battery 50 to monitor the charge of the battery 50 and cause the battery 50 to be recharged should the charge fall below a predetermined level. The main controller 58 is in electrical or signal (Wife, Bluetooth, 5G, NFC, <1 GHZ) communication with the various electric devices 34 and 36 and the sensors, receives data from the connected devices 34, 36 and the sensors, and supplies operating signals to them.

The main controller 58 is housed in a mechanical housing that protects and isolates the main controller from such forces as impact, shock, motion, and other forces seen in the appropriate function of a door system. The main controller 58 is also accessible through one or more buttons exposed on the exterior of the door. This allows for physical access to main controller's functions without needed to remove the main controller 58 from inside the door slab 15. These buttons could be used for power reset, radio enabling (e.g. Bluetooth), factory reset, or other such functions as needed for electric devices.

Figure 14:
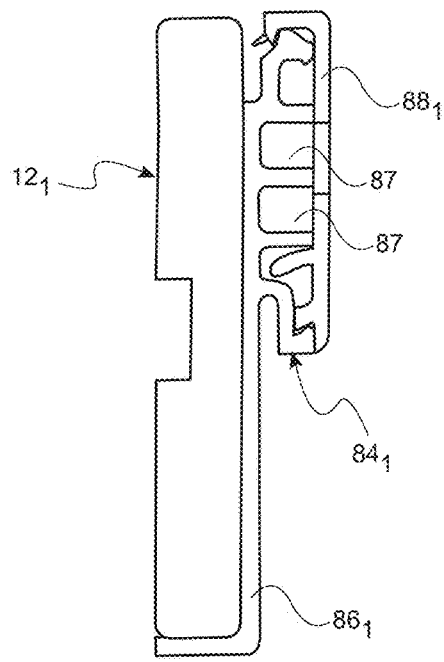
FIG. 14 is a plan sectional view of the first wiring mounting device mounted to the hinge side jamb member.
Figure 15:
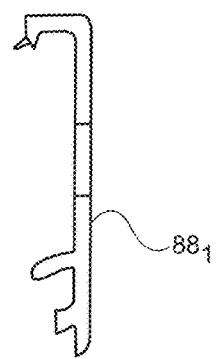
FIG. 15 is a sectional view of a snap-on cover of the first wiring mounting device.
Figure 16:
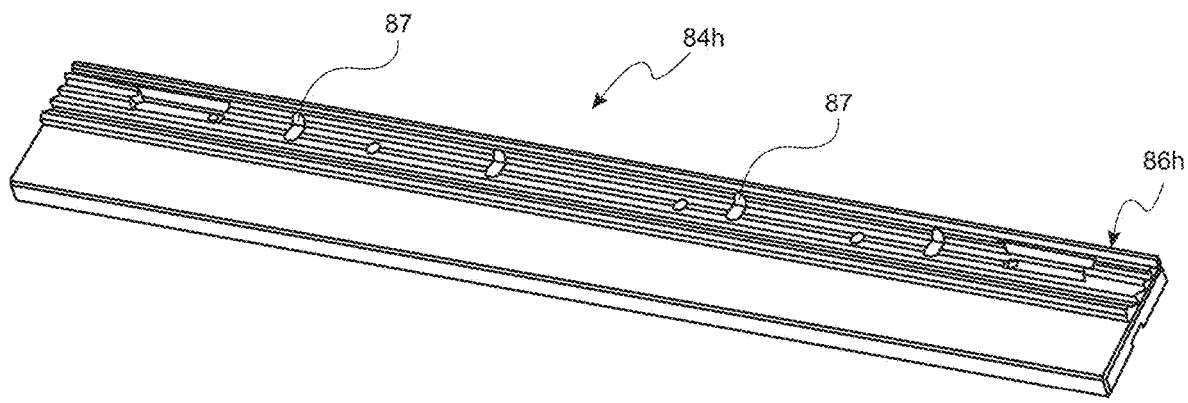
FIG. 16 is a perspective view of a header base member of the header wiring mounting device.

The door system 10 further comprises at least one wiring mounting device 84 for mounting the power and data wiring on the outer door frame 12 of the door assembly 11. FIGS. 10-16 show the door system 10 includes two wiring mounting devices: a first (or hinge) wiring mounting device $84_1$ mounted to the hinge side jamb $12_1$, and a header wiring mounting device $84h$ mounted to the header $12h$. The hinge wiring mounting device $84_1$ includes a first base member $86_1$ defining one or more wiring conduits (or channels) 87 and a snap-on protective cover $88_1$ removably attachable to the first base member $86_1$ to cover the wiring conduits 87, as best shown in FIGS. 14 and 15. The wiring mounting devices 84 are made of material, such as plastic. The base plate $86_1$ is configured to be secured, such as by snap fitting, to the front side $12_{1F}$ of the first jamb member $12_1$ so as to face the door 14 when the door 14 is closed, and has hinge cutouts 89 complementary to the mortises 17 for accepting respective hinge leaf elements, as best shown in FIGS. 10 and 14. The header wiring mounting device $84h$ includes a header base member $86h$ defining one or more wiring conduits (or channels) 87 and a snap-on protective cover $88h$ removably attachable to the header base member $86h$ to cover the wiring conduits 87, as best shown in FIGS. 11 and 16. The base plate $86h$ is configured to be secured, such as by snap fitting, to an inner (or front) side the header $12h$ so as to face the door 14 when the door 14 is closed. The protective cover 88 is an optional element of the wiring mounting device 84.

The one or more wiring conduits 87 are provided for routing and accessing the wiring harness located around the door frame 12. The wiring harness may be pre-installed within the wiring conduits 87 and covered by the snap-on protective cover 88 of the door assembly 11, and later accessed by removing the snap-on protective cover 88 to reveal the wiring harness disposed within the wiring conduits 87 of the base member $86_1$ or $86h$. The wiring runs around a portion or an entire perimeter of the outer door frame 12 from and to the various hi/low power supply/battery/control devices to connect to the electric devices 36. In other words, one or each of the hinge side jamb $12_1$, the latch side jamb $12_2$ and the header $12h$ may be equipped with the wiring mounting device for enclosing the wiring contained in the wiring conduit(s) 87. The door frame members $12_1$, $12_2$ and $12h$ may include, as does the door 14, pockets and openings to accommodate electric devices.

The wiring harness may be run to the DC power distribution system 48, and may be pre-mounted to the first and second stiles $22_1$ and $22_2$, and the top rails $21_1$.

Figure 8:
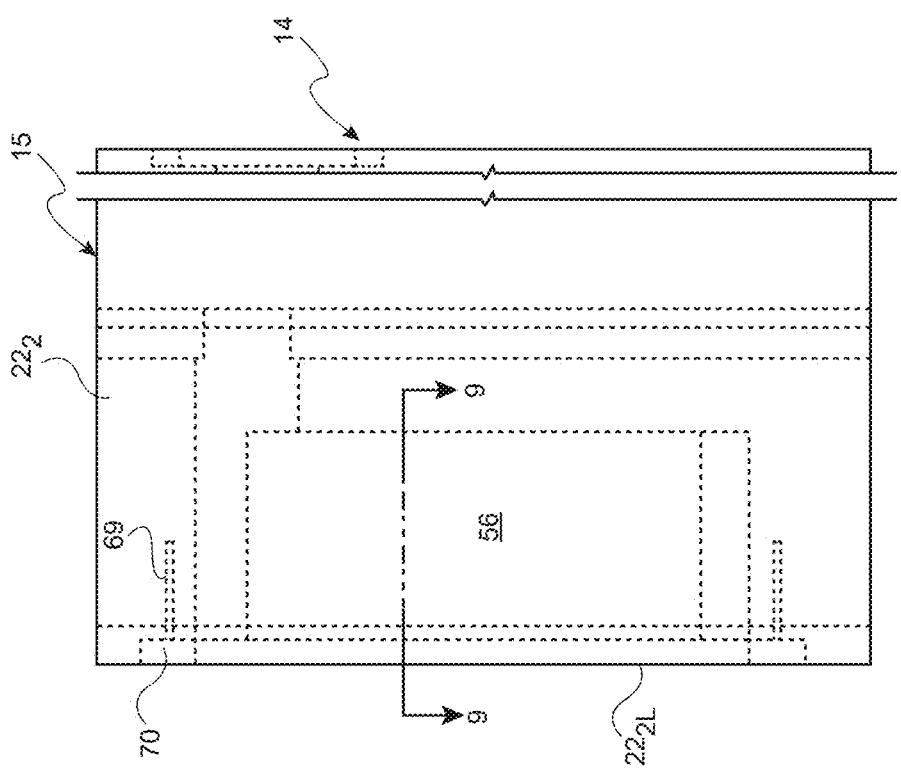
FIG. 8 is a partial plan sectional view of a door pocket as shown in FIG. 7.
Figure 12:
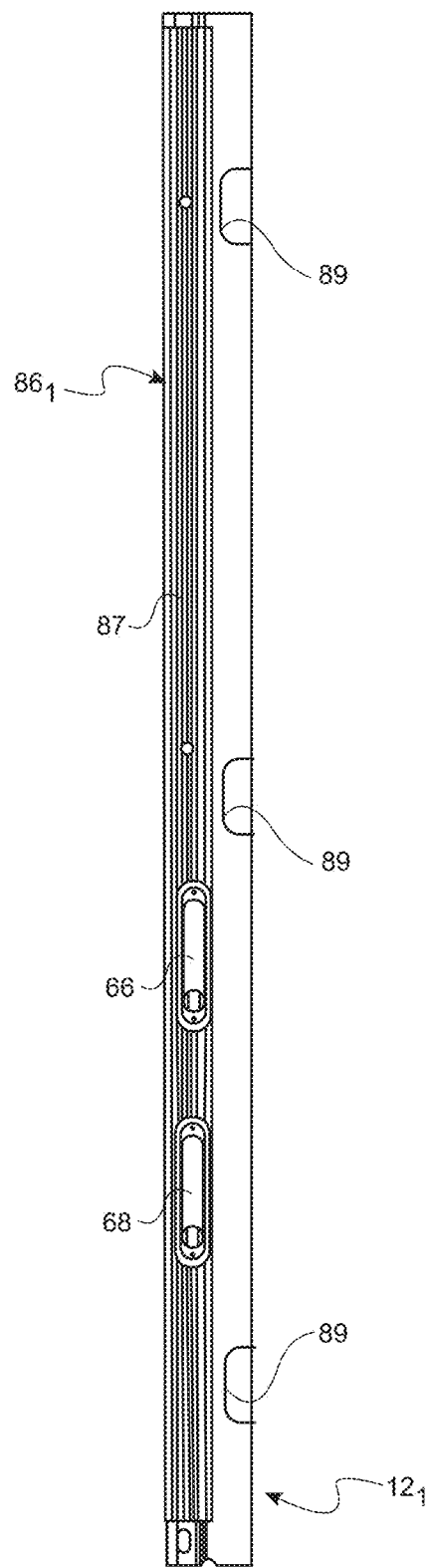
FIG. 12 shows a hinge edge of the hinge side jamb member of the outer door frame according to the first exemplary embodiment of the present invention with a first base member of the first wiring mounting device mounted thereto.
Figure 13:
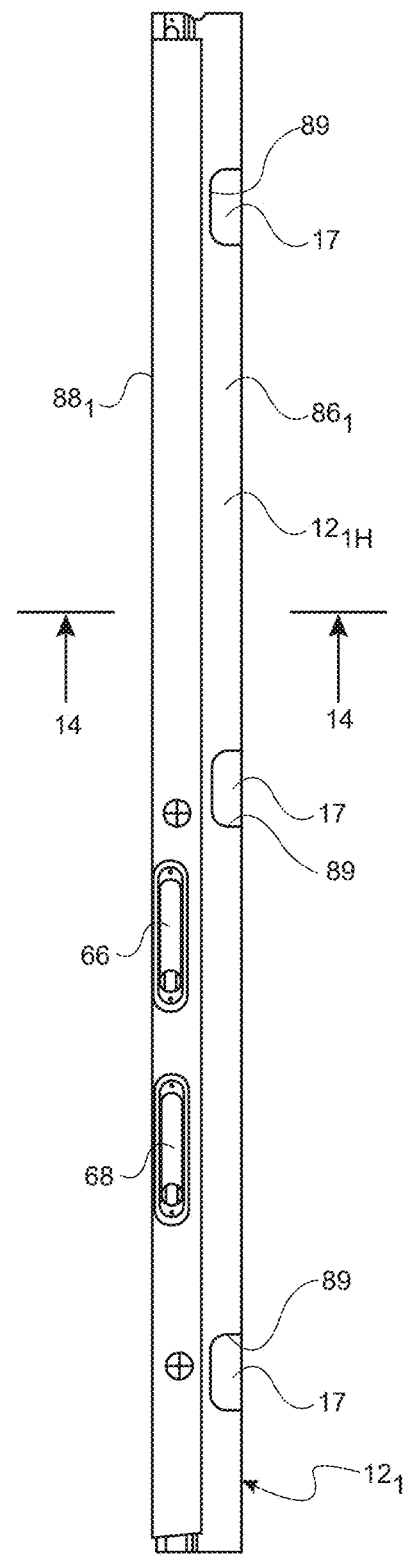
FIG. 13 shows the hinge edge of the hinge side jamb member of the outer door frame according to the first exemplary embodiment of the present invention with the first wiring mounting device mounted thereto.
Figure 17A:
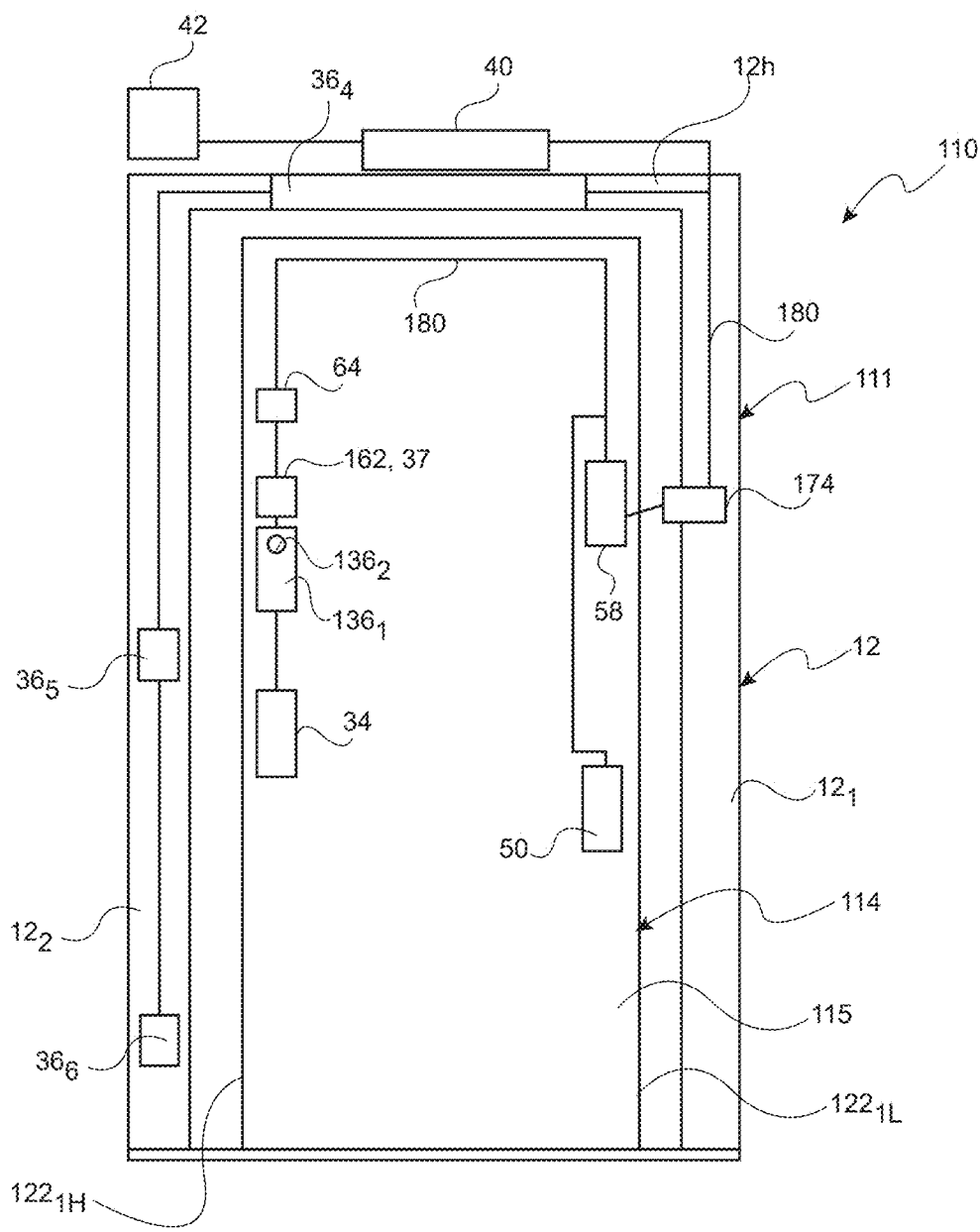
FIG. 17A is a schematic view showing a door system according to a second exemplary embodiment of the present invention.

FIGS. 17A-8 illustrate a second exemplary embodiment of a door system generally depicted with the reference numeral 110. Components, which are unchanged from the first exemplary embodiment of the present invention, are labeled with the same reference characters. Components, which function in the same way as in the first exemplary embodiment of the present invention depicted in FIGS. 1-16 are designated by the same reference numerals to some of which 100 has been added, sometimes without being described in detail since similarities between the corresponding parts in the two embodiments will be readily perceived by the reader.

The door system 110 comprises a conventional hinged residential exterior door assembly 111, but it should be understood that the door assembly 111 may be either an exterior or interior door assembly having a pivotal door provided for a residential or commercial building, such as a home, apartment, garage, condominium, hotel, office building, or the like. The door assembly 111 may be made of any appropriate material suitable for the purpose, such as wood, metal, wood composite material, fiberglass reinforced polymer composite or the like. The door assembly 111 includes a substantially rectangular outer door frame 12 and a door 114 including a door slab 115 pivotally attached thereto by at least one hinge, such as a "butt hinge" that includes two leaves, similar to the door slab 15 according to the first exemplary embodiment.

The door system 110 further comprises a number of DC (i.e., direct current) electric components (devices) mounted to the door slab 115 itself or the outer door frame 12 of the door system 110 to provide functions, such as electronic access control, door state feedback sensor(s), entry camera, ambient light sensor, and audio/video communication, etc. As illustrated in FIG. 17A, the electric devices that are mounted to the smart ready door 114 of the door system 110 include, but are not limited to, an electric power door lock 34, a video doorbell $136_1$ with a digital video camera $136_2$, a motion detector (or motion sensor) 162 integrated with an ambient light sensor 37, and a door state sensor 64. The video doorbell $136_1$ with the digital video camera $136_2$ and the motion sensor 162 with the ambient light sensor 37 are integrated in a single unit, which is disposed in a pocket $156_1$ formed (i.e., machined or otherwise formed) in in the lock side stile $122_2$ of the inner door frame 120, as shown in FIGS. 19 and 20B.

The electric devices that are mounted to the outer door frame 12 of the door system 110 include, but are not limited to, a door face illumination LED light $36_4$ mounted to the header 12h of the outer door frame 12, and first and second side jamb LED lights $36_5$ and $36_6$, respectively, as illustrated in FIG. 17A. As further shown in FIG. 17A, the door face illumination LED light $36_4$ is centered within the header 12h of the outer door frame 12. The first side jamb LED light $36_5$ is mounted to the hinge side jamb $12_1$ of the door frame 12 adjacent to the power door lock 34 when the door 114 is closed, while the second side jamb LED light $36_6$ is mounted to the hinge side jamb $12_1$ adjacent the bottom thereof.

Figure 18:
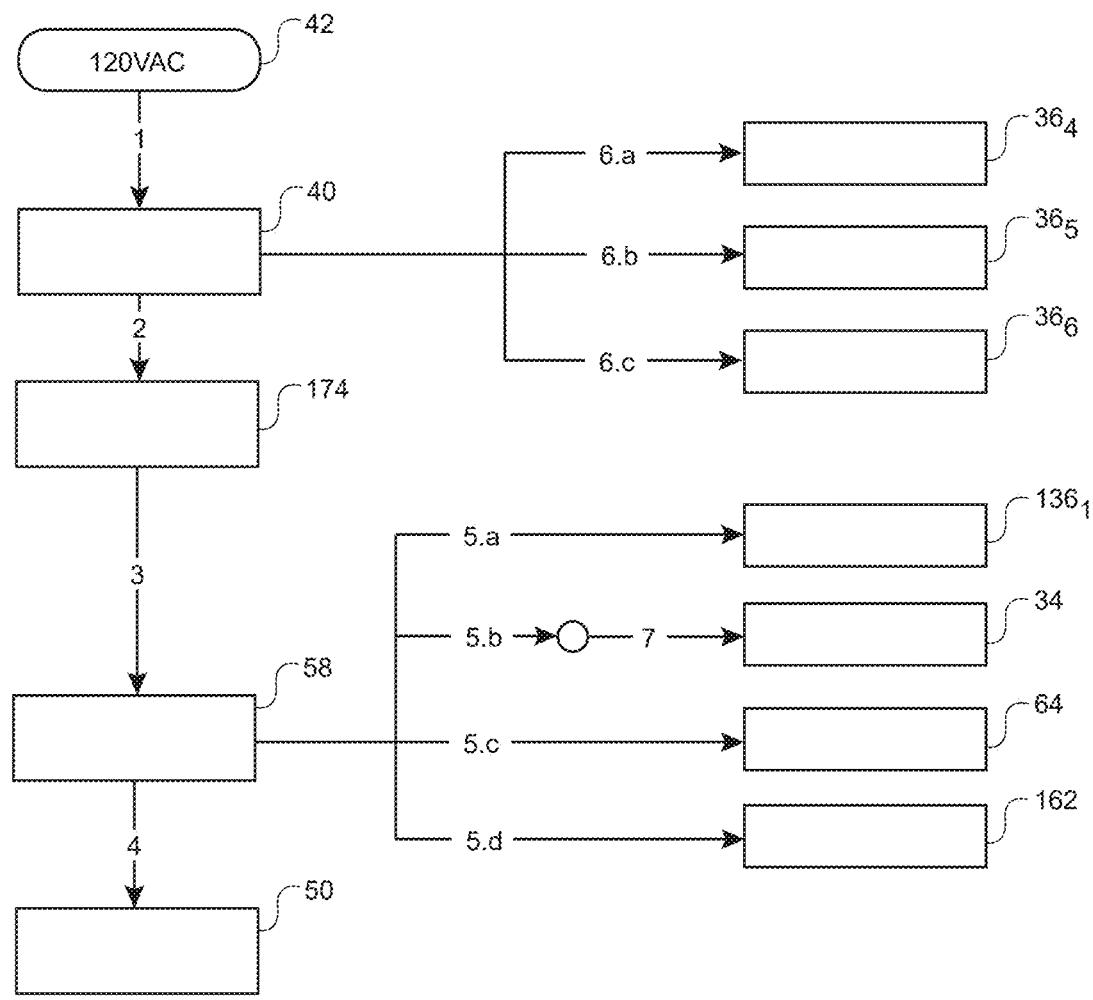
FIG. 18 is a block diagram of the door system according to the second exemplary embodiment of the present invention.
Figure 19:
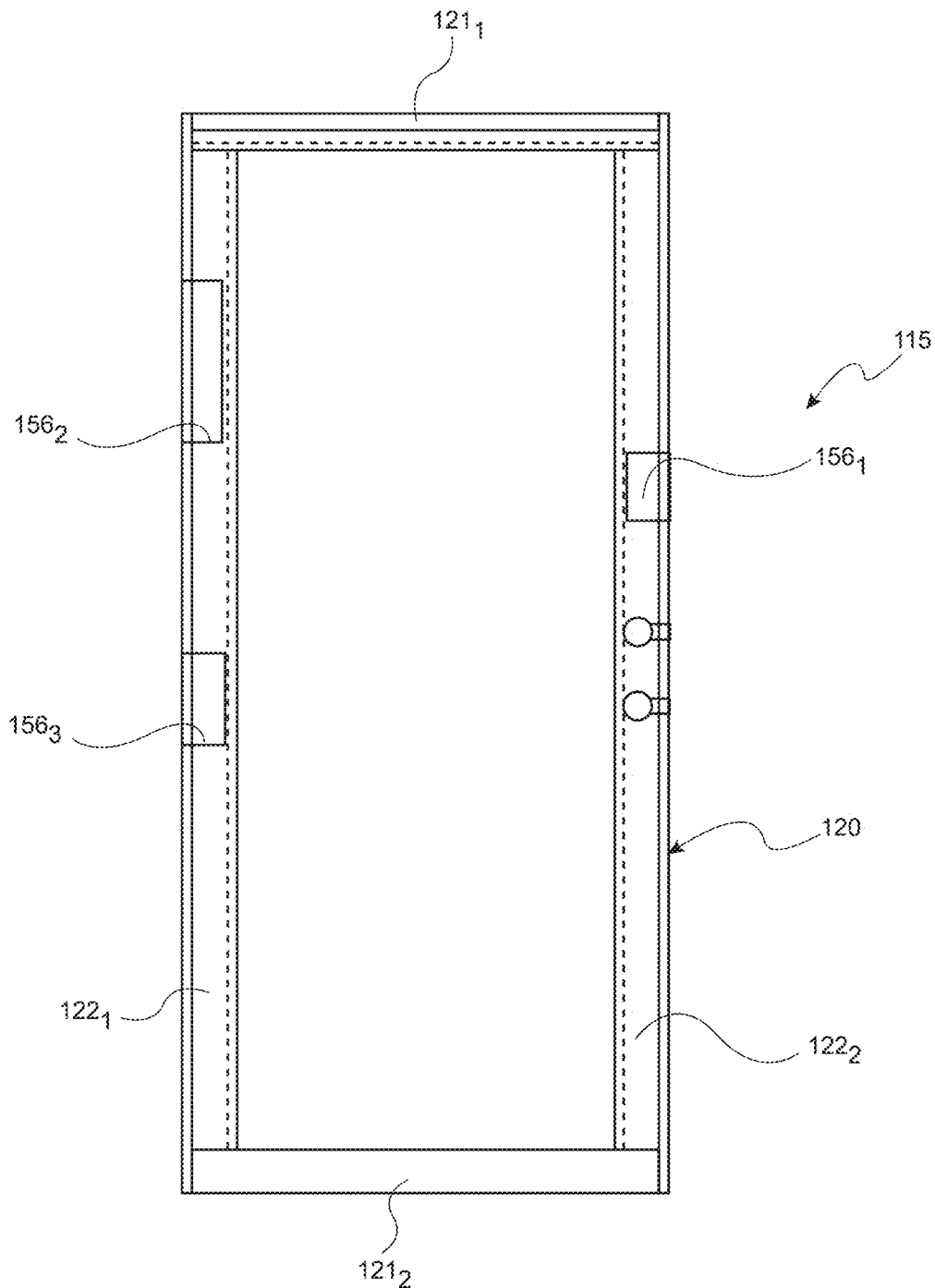
FIG. 19 is an elevational view of a door slab of the door system according to the second exemplary embodiment of the present invention.

As illustrated in FIGS. 17A, 18 and 19, the door system 110 further comprises a DC power supply unit (PSU) 40 including a power converter, such as a low-voltage (such as 5 volts (V), 12 volts, 24 volts or other required voltage, preferably 12 VDC/3 A) AC to DC (AC/DC) converter. The PSU 40 is mounted to the outer door frame 12. As best illustrated in FIG. 18, the PSU 40 is disposed, in the second exemplary embodiment, in the header 12h of the outer door frame 12. Preferably, the PSU 40 and the AC distribution unit 46 are located in a pocket (or slot) machined or otherwise formed in the header 12h of the outer door frame 12, as best shown in FIG. 18, so that the PSU 40 is accessible from the outside for installation, repair or replacement. The PSU 40 is centered within the header 12h of the outer door frame 12.

Figure 17B:
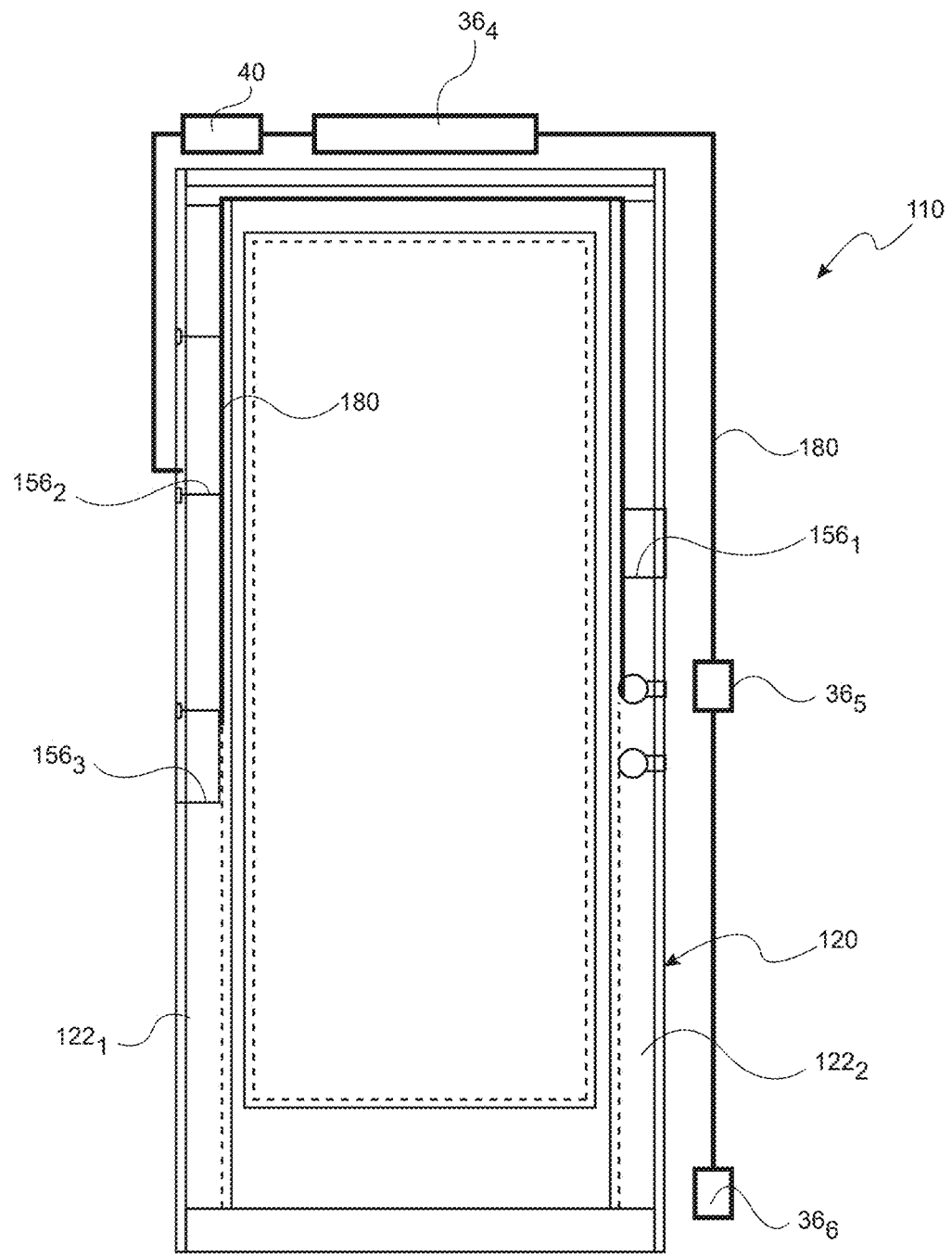
FIG. 17B is a schematic view showing a door system according to an alternative exemplary embodiment of the present invention.
Figure 17C:
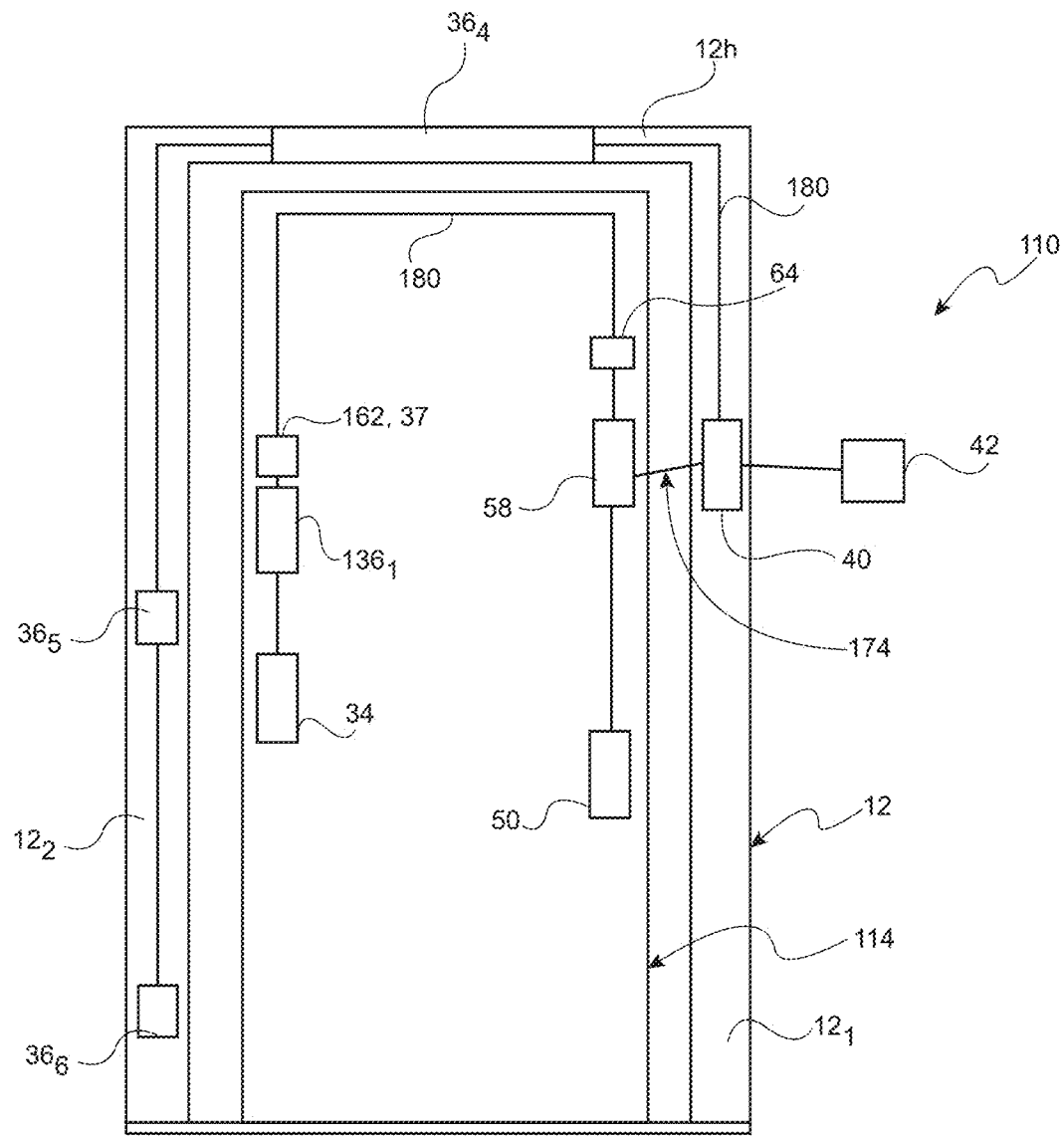
FIG. 17C is a schematic view showing a door system according to another alternative exemplary embodiment of the present invention.

Alternatively, the PSU 40 may be located off center in the header 12h of the outer door frame 12, as shown in FIG. 17B. Further alternatively, the PSU 40 may be located elsewhere on the outer door frame 12, such as in the hinge side jamb $12_1$ of the outer door frame 12, as shown in FIG. 17C.

Figure 20A:
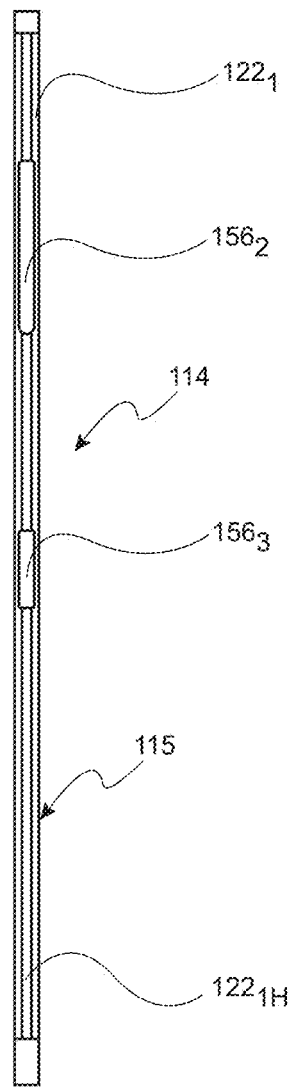
FIG. 20A is an edgewise view of a hinge edge of the door slab according to the second exemplary embodiment of the present invention.
Figure 20B:
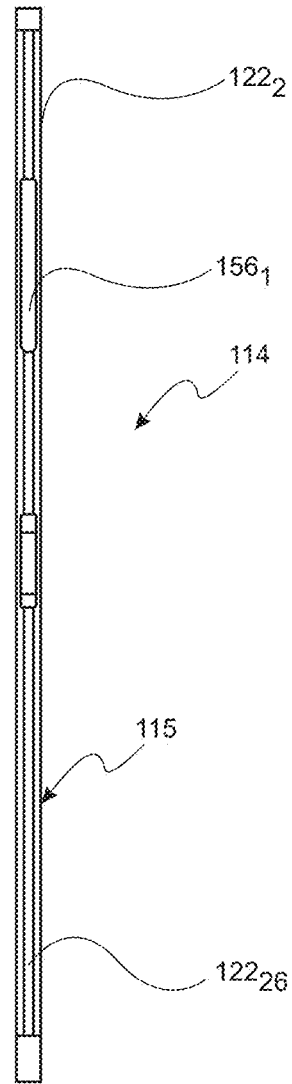
FIG. 20B is an edgewise view of a lock edge of the door slab according to the second exemplary embodiment of the present invention.

As illustrated in FIGS. 17A, 18 and 19, the door 114 of the door system 110 also includes a main controller 58 configured and programmed to receive input from one or more sensors, such as the motion detector 162, a proximity sensor, the ambient light sensor 37, the door state sensor 64, a smoke detector, etc. The main controller 58 includes printed circuit electrical boards (PCBAs), preferably automotive grade components that are suitable for high and low temperatures, and which are conformally coated to protect against moisture and dust particles. The main controller 58 may slide into a pocket (or slot) $156_2$ formed (i.e., machined or otherwise formed) in the lock side stile $122_2$ of the inner door frame 120, as shown in FIGS. 19 and 20A.

Figure 20C:
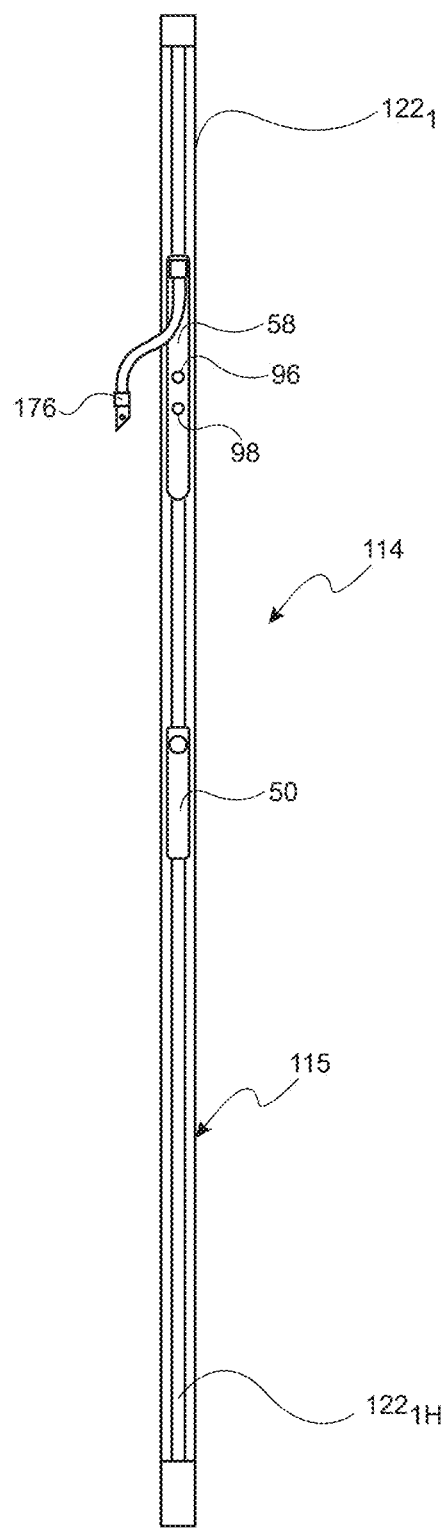
FIG. 20C is an edgewise view of the hinge edge of the door slab according to the second exemplary embodiment of the present invention showing a battery and a main controller mounted thereto.

A main controller/ECU CAN communication bus is used to communicate with the other electric devices. The use of this protocol allows easy addition of electric devices. The door system 110 additionally includes a push button 96 located on the hinge side of the door 114, as best shown in FIG. 20C, that enables the door system 110 to connect to (or pair) a user's phone via Bluetooth. This allows for a user friendly and secure way for setting up the door on a home-owner's WiFi. Also, a reset push button 98 is provided that resets the door peripherals noted above (for example, the doorbell $136_1$, the power door lock 34, a sensor hub and/or the main controller 58) assists with quick troubleshooting. The reset push button 98 is preferably located on the hinge side of the door 114 adjacent the push button 96, as best shown in FIG. 20C. The reset push button 98 may also be used to perform a factory reset of the door system 110, which is beneficial for troubleshooting and to erase any user specific data (i.e. WiFi credentials, usage data), which can be a privacy concern when transferring home ownership. In addition, a visual LED indicator is integrated into the push button 96 to show, from a short distance, when door system 110 is powered up, running on battery, in Bluetooth advertising mode, etc., also allowing for quick troubleshooting during installation and general use.

The central ECU 58 controls the electric power door lock 34, and the electric devices $136_1$, $136_2$, $36_4$-$36_6$, 37, 64, 162, etc. Accordingly, the central ECU 58 is in communication with the electric power door lock 34 and the electric devices $136_1$, $136_2$, $36_4$-$36_6$, 37, 64, 162 through power and data wiring, via ethernet, CAN, or serial communication. Alternatively, the central ECU 58 may be in communication with the electric power door lock 34 and the electric devices $136_1$ and 364-366 through one of the following wireless technologies: Bluetooth®, NFC, Zigbee, Zwave, Wi-Fi, LAN, mobile telecommunications technology (3G, 4G or 5G), etc.

The main controller 58 is configured to cooperate with the wire harness 180 to supply DC power to the DC electric device $136_1$, 1362, 364-366 and the sensors 37, 64, 162, and to supply operating (or command) signals to the DC electric devices in response to signals from the at least one sensor for operating the DC electric devices $136_1$, $136_2$, $36_4$-$36_6$ and to receive operational signals from the DC electric devices $136_1$, $136_2$, $36_4$-$36_6$ responsive to the operating signals.

As illustrated in FIGS. 18 and 19, the door system 110 further includes a low-voltage back-up battery (or battery pack) 50 mounted to the door 114, such as to an inner door frame 20 of the door slab 115. The back-up battery 50 may slide, snap or rotate into a pocket (or slot) $156_3$ formed (i.e., machined or otherwise formed) in in the hinge side stile $122_1$ of the inner door frame 120 and secured therein, as shown in FIGS. 19 and 20A.

Figures 21A, 21B:
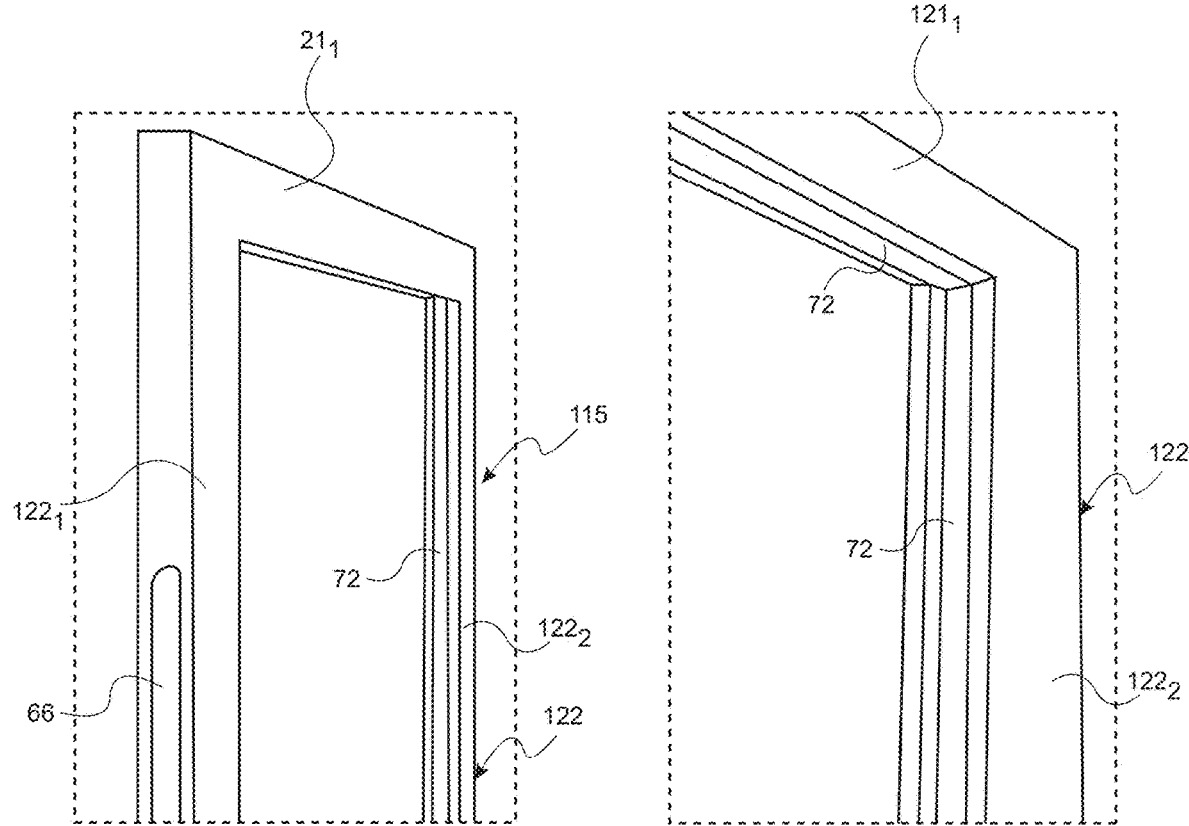
FIG. 21A is a partial perspective view of a door slab according to the second exemplary embodiment of the present invention.
FIG. 21B is an enlarged perspective view of the door slab as shown in FIG. 21A.
Figure 22A:
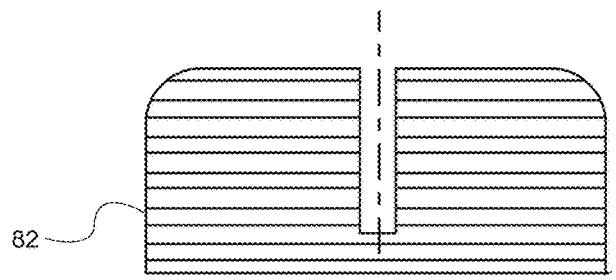
FIG. 22A is an elevational view of a clip used to keep a wiring harness in inner wiring grooves.
Figure 22B:
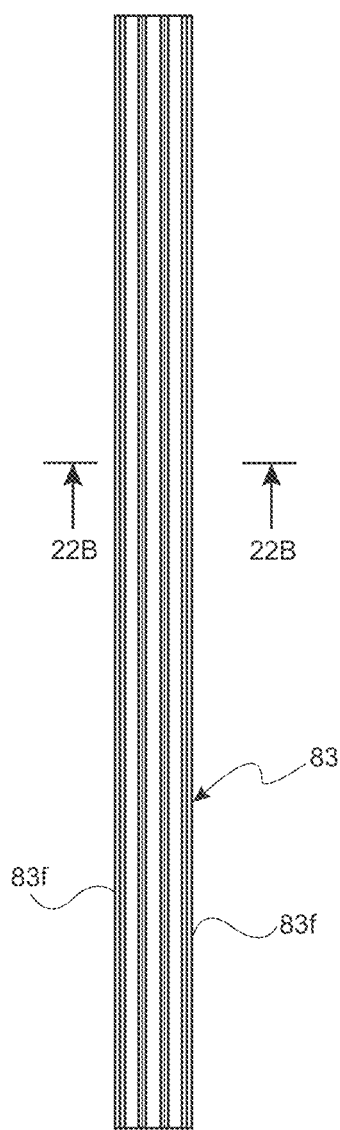
FIG. 22B is an elevational view of a wire channel protector used to prevent wiring harness damage.
Figure 22C:
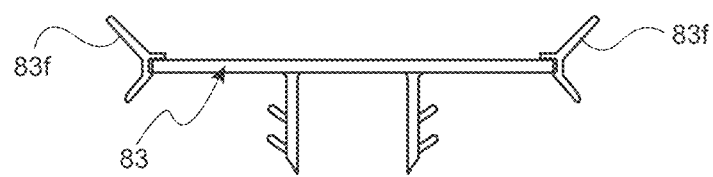
FIG. 22C is a sectional view of the d wire channel protector taken along the line 22C-22C in FIG. 22B.

The PSU 40 is electrically connected to the door 114 through an electric power transfer (EPT) device 174, as illustrated in FIGS. 5A and 5B. In the second exemplary embodiment, the wiring harness 180 runs from the low voltage PSU 40 to the main controller 58 through the EPT device 174, as shown in FIGS. 17A and 18. The wiring harness 180 may be pre-mounted to the first and second stiles $122_1$ and $122_2$, and the top rail $121_1$, thus allowing the power door lock 34, the electric devices 136, the back-up battery 50, the ambient light sensor 37, the motion detector 62 and the door state sensor 64 to be plugged-in so that electric power, data, and/or signals can be supplied for use and functioning of the electric devices 34, $136_1$, $36_4$-$36_6$, and the sensors 37, 62, 64. Specifically, the first and second stiles $122_1$ and $122_2$, and/or the top rail $121_1$ of the door slab 115 are formed with wiring grooves (or wire channels) 72 inside the door slab 15, as best shown in FIGS. 21A and 21B. The wiring grooves 72 define a wire conduit for the door 114. The wiring grooves 72 are cut, routed or extruded into inner or outer sides of the stiles $122_1$, $122_2$ and the top rail $121_1$ that will be used to house the wiring harness 180. Moreover, a clip 82, best show in FIG. 22A, may be used to keep the wiring harness 180 inside the wiring groove 72. The wiring harness 180 may be jacketed to be protected against the foam core 18 used to fill the door slab 115. Cardboard, plastic, rubber, or other appropriate material foam dams 83 (or wire channel protectors), as shown in FIGS. 22B and 22C, can be used to prevent wiring harness damage from the foaming process during door assembly and manufacture.

The foam dams 83 are provided for sealing foam from entering the wire channels 72 by using the wire channels 72 as a guide. The foam dams 83 have flexible fins 83f thereon to seal against the door skins 23, 24. The wire channel protectors are used to prevent the core 18 from interacting with the wiring harness 180 within the wiring conduit. The channel protector could seal on the door skins, on the wiring conduit, on the stiles, on the rails or any other location within the inner frame of the door. Alternatively, tape/glue can be used to hold the power and/or data wiring harness 180 in the grooves 72 such that the wires in the stiles and/or rails are kept away from the cutout areas. For doors of differing widths, the standard-length wire harness may be folded inside the stiles and/or rails as necessary, so to shorten the run length. Providing electric power to the door system 110 and the door 114 minimizes the need for changing batteries, thus assuring more reliable operation and functioning of the power door lock 34 and the electric devices. Because the AC power is within the wall or the door frame 12, only low voltage DC power is supplied to the door 114 to minimize the possibility of an unintended electric shock.

Figure 23:
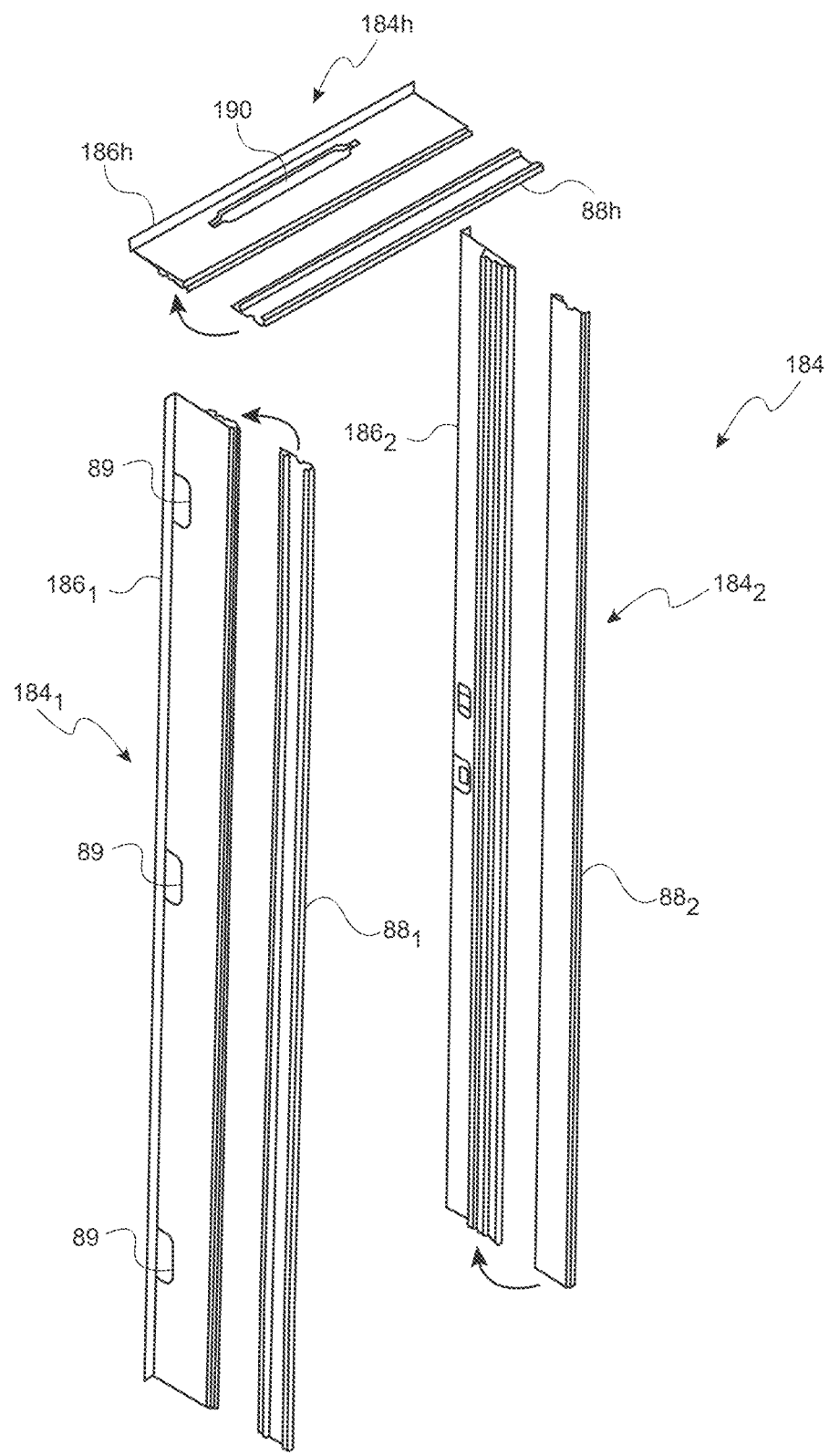
FIG. 23 is a perspective exploded view showing first wiring mounting devices.
Figure 24:
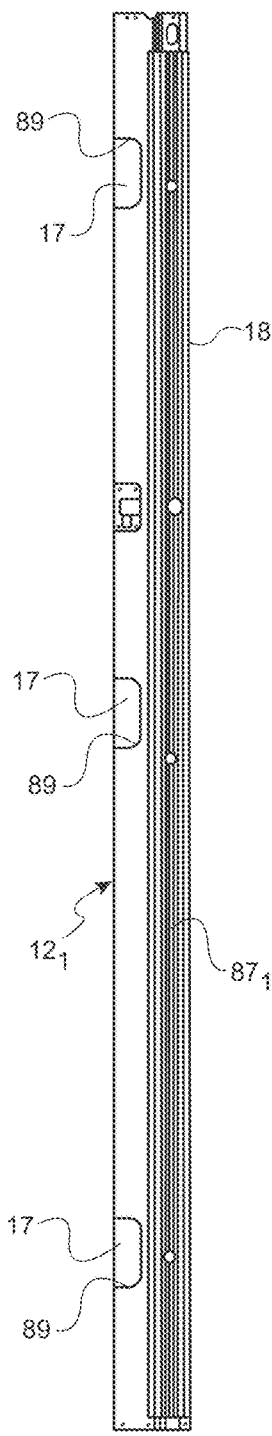
FIG. 24 shows a hinge edge of the hinge side jamb member of the outer door frame according to the second exemplary embodiment of the present invention with a first base member of the first wiring mounting device mounted thereto.
Figure 25:
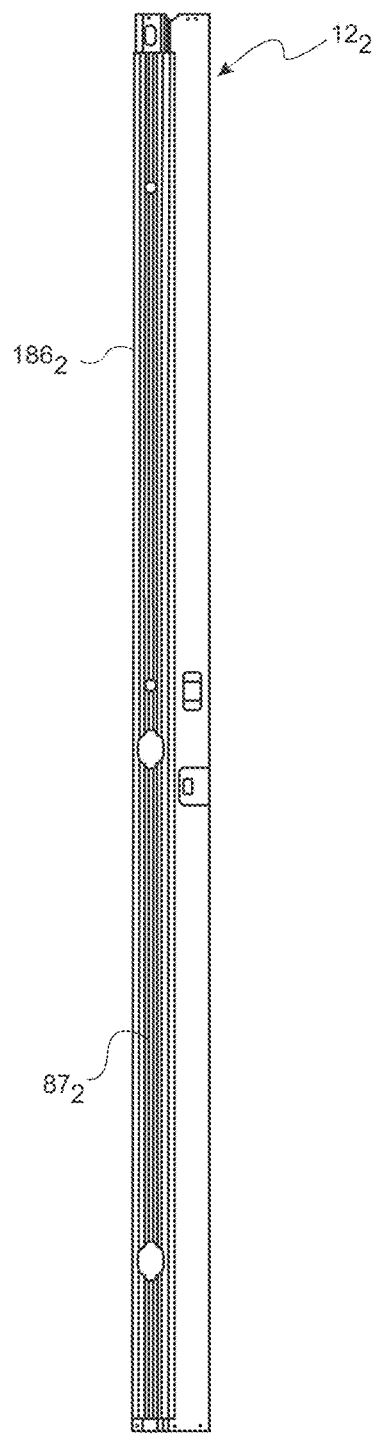
FIG. 25 shows a lock edge of the lock side jamb member of the outer door frame according to the second exemplary embodiment of the present invention with a second base member of the second wiring mounting device mounted thereto.
Figure 26:
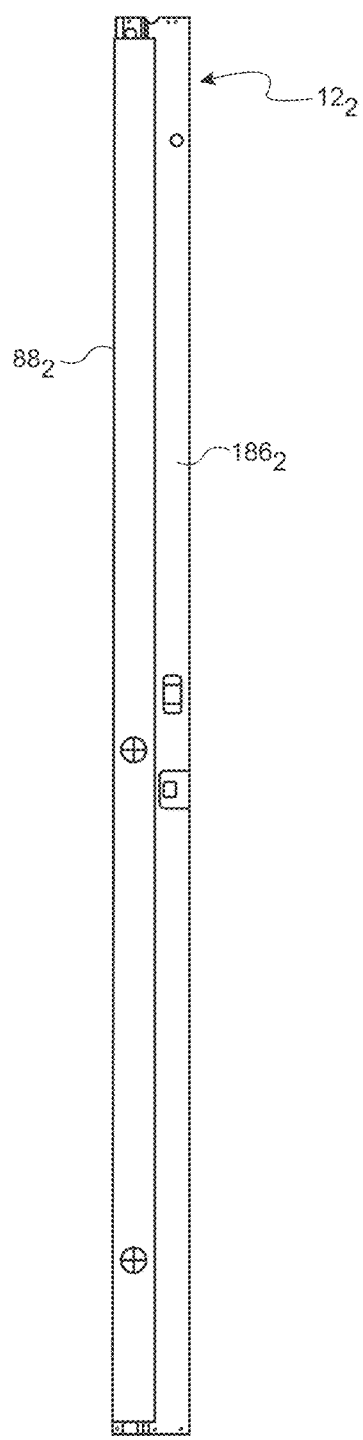
FIG. 26 shows the lock edge of the lock side jamb member of the outer door frame according to the second exemplary embodiment of the present invention with the second wiring mounting device mounted thereto.
Figure 29:
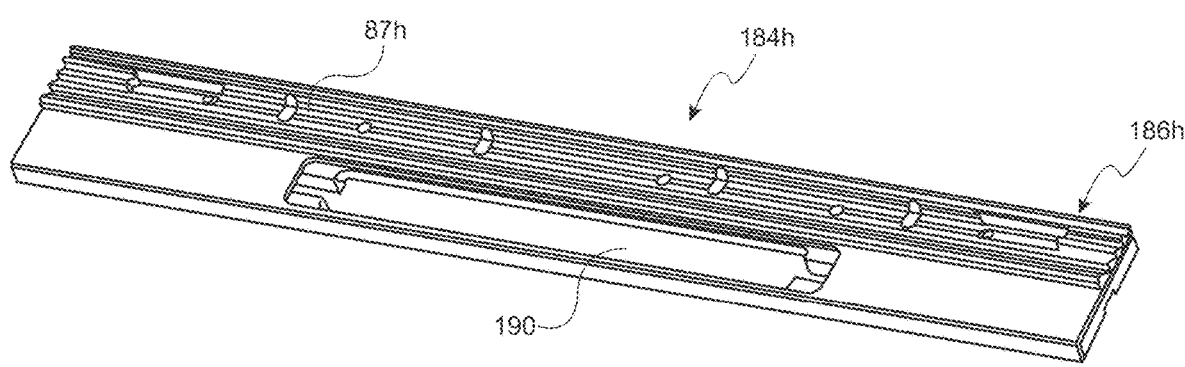
FIG. 29 is a perspective view of a header base member of the header wiring mounting device according to the second exemplary embodiment of the present invention.

The door system 110 further comprises at least one wiring mounting device 184 for mounting the power and data wiring on the door frame 12 of the door assembly 111. FIGS. 23-26 show the door system 110 with three wiring mounting devices: a first (or hinge side) wiring mounting device $184_1$ mounted to the hinge side jamb $12_1$, a second (or lock side) wiring mounting device $184_2$ mounted to the lock side jamb $12_2$ and a header wiring mounting device 184h mounted to the header 12h. The hinge side wiring mounting device $184_1$ includes a first base member $186_1$ defining one or more wiring conduits (or channels) $87_1$ and a snap-on protective cover $88_1$. The first base plate $86_1$ is configured to be secured, such as by snap fitting, to the first jamb member $12_1$ and has hinge cutouts 89 complementary to the mortises 17 for accepting respective hinge leaf elements, as best shown in FIGS. 23 and 24. The lock side wiring mounting device $184_2$ includes a second base member $186_2$ defining one or more wiring conduits (or channels) $87_2$ and a snap-on protective cover $88_2$. The second base plate $186_2$ is configured to be secured, such as by snap fitting, to the second jamb member $12_2$, as best shown in FIGS. 23 and 25-28. The header wiring mounting device 184h includes a header base member 186h defining one or more wiring conduits (or channels) 87h and a snap-on protective cover 88h, as best shown in FIGS. 23 and 29. The header base member 186h is configured to be secured, such as by snap fitting, to the header 12h.

Using the power and data wiring conduits $87_1$, $87_2$ and 87h as shown in FIGS. 23-29, the household line power, i.e., 85-265 VAC 50/60 Hz, is routed into the header 12h of the door frame 12 where it connects to the PSU 40 installed in a pocket (or slot) in the header 12h through a slot 190 (best shown in FIGS. 23 and 29) formed in the header base member 186h of the header wiring mounting device 184h. The pocket in the header 12h of the door frame 12 is machined or otherwise formed in the header 12h of the door frame 12.

Figures 27, 28:
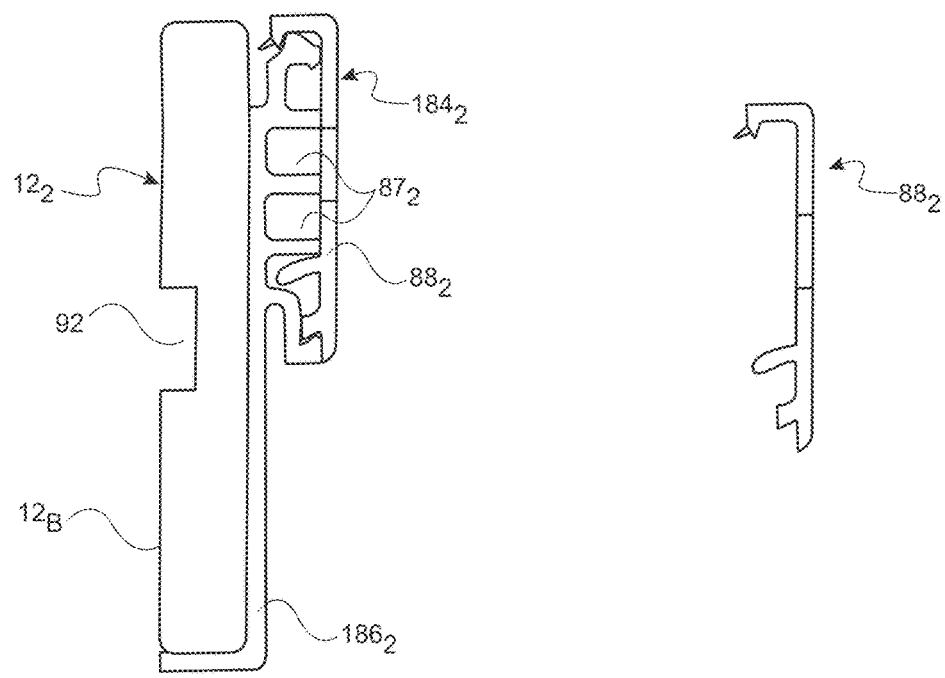
FIG. 27 is a plan sectional view of the second wiring mounting device mounted to the lock side jamb member.
FIG. 28 is a sectional view of a snap-on cover of the second wiring mounting device.
Figure 30:
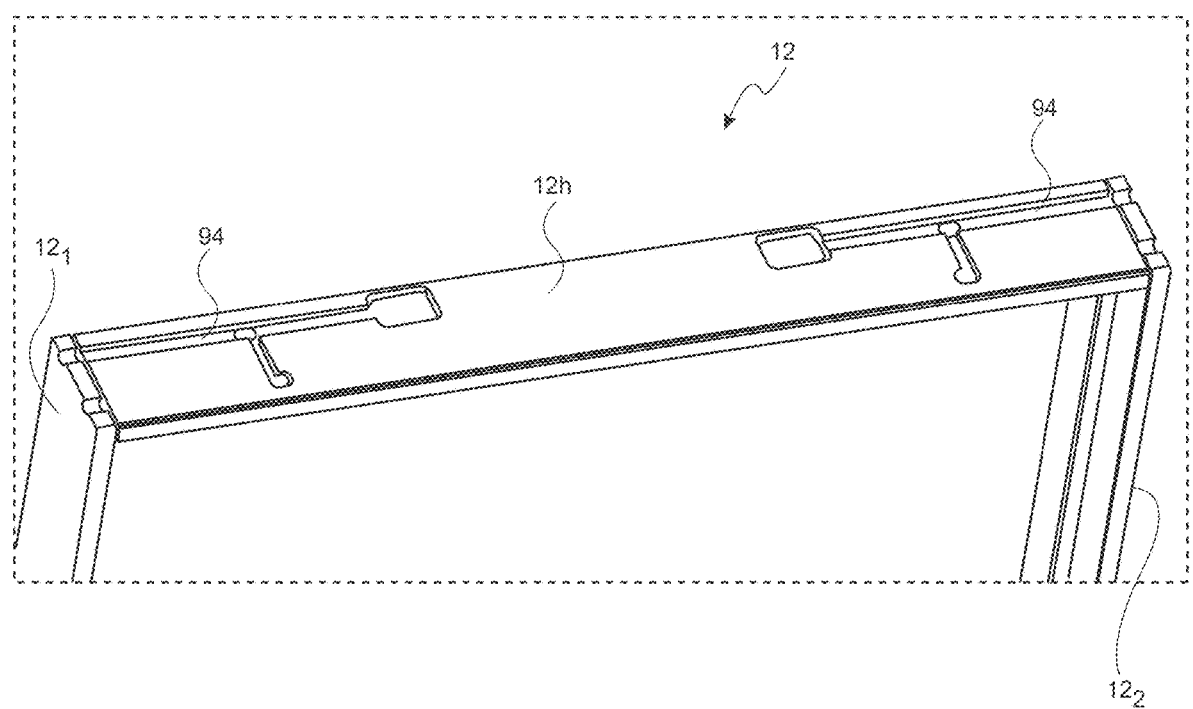
FIG. 30 is a partial perspective view showing the outer door frame with a header according to the present invention.

The first and second jamb members $12_1$, $12_2$ may be formed with outer wiring grooves 92 on back sides $12_{1B}$ or $12_{2B}$ thereof, opposite to the door slab 115, best shown in FIG. 27, while the header 12h of the door frame 12 is formed with outer wiring grooves 94 on an outer side thereof opposite to the door slab 115, best shown in FIG. 30. The outer wiring grooves 92 and 94 define a wire conduit for the door frame 12. The wiring grooves 92 and 94 are cut, routed or extruded into the jamb members $12_1$, $12_2$ and 12h that will be used to house the wiring harness 180.

The wiring mounting device 184 is provided for all power and data wiring elements outside of the door 114. The wiring mounting device 184 both protects and locates the wiring/data harness for subsequent access, and also protects the contained wiring harness from installers by keeping wires away from typical nailing or other fastener locations and allowing labelling to assist installers in this avoidance. The wiring/data harness can be routed in the hinge side and lock side jambs $12_1$ and $12_2$ to installed LEDs $36_4$-$36_6$ and to the EPT 174. Separating the functions of power distribution can also enable easy replacement of damaged elements of the EPT 174. The EPT 174 then passes power to the door 114 and the connected electric devices.

The protective cover 88 may be easily pried off/opened to access the wiring harness and to provide good fit and trim appearance around wiring access points along the frame perimeter. In addition, the protective cover 88, itself, or short connector/replacement segments therefor, may be fit with, for example, LED lights or sensors/cameras that may directly tap into the underlying wiring contained in the wiring conduits 87. Wiring is then passed into the door 114 via the EPT 40 to wire/cable routed around the inside(s) of the stiles/rails of the inner door frame 20 before door assembly and foam injection. This wiring organization allows quick addition of jamb and/or door electrical and smart electrical components in the future as designs change and performance warrants. It also allows the door 114 to be easily disconnected from the door frame 12 in the event that a homeowner wishes to remove the door to allow more room for larger objects to be caried through the opening.

Figures 31A, 31B:
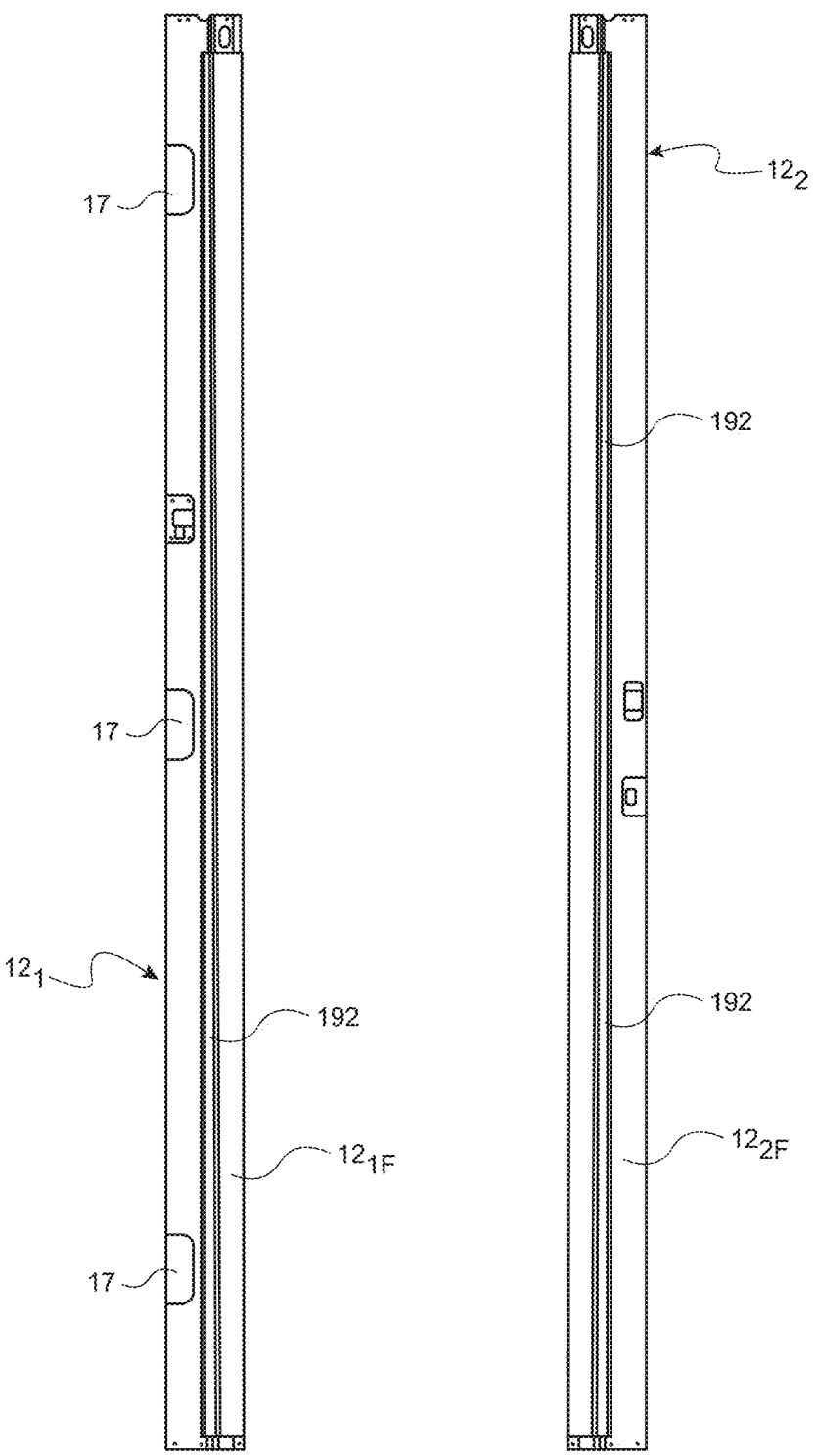
FIGS. 31A-31C show jamb members of the outer door frame formed with wiring grooves.
Figure 31C:
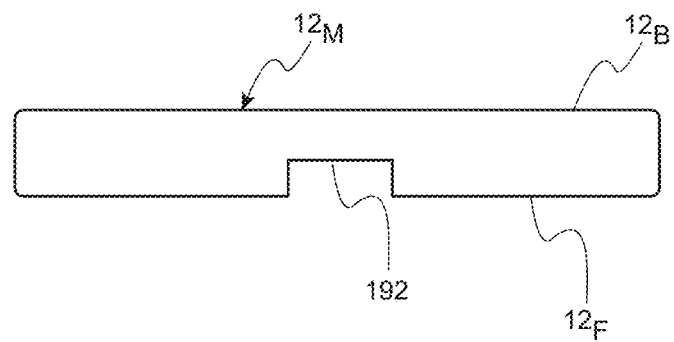

Alternatively, instead of the wiring mounting devices 84 or 184, mounted to the jamb members $12_M$, the jamb members $12_M$ may be formed with outer wiring grooves 92 on back sides $12_B$ thereof, opposite to the door slab 15 or 115, best shown in FIG. 27, or an inner wiring groove 192 formed on a front side $12_F$ of the jamb members $12_M$ facing the door slab 15 or 115, best shown in FIG. 31A-31C. The wiring grooves 92 or 192 are provided for and define the wiring conduit for accepting and routing the wire harness 180. The wiring grooves 92 or 192 are cut, routed or extruded into the jamb members $12_M$ so as to be used to house the wiring harness 180.

As noted, the door 14 or 114 can be constructed with multiple prewired receptacles where electric devices and/or the battery can simply be plugged into an edge of the door 14 or 114 and a cover plate installed to enclose the electric devices. A housing for each of the receptacles may be molded from a flame retarded polymer that meets the necessary UL and regulatory requirements for housing electric devices. The housing for each of the receptacles may be inserted into one of the slots 56, 66, 68 or 156 machined or otherwise formed into the latch stile $22_2$ or $122_2$ or hinge stile $22_1$ or $122_1$ of the door 14 or 114. The housing might also be, as previously noted, wholly or partly made of a suitable metal, with or without holes, so as to create a "heat sink" effect or insulation effect for the installed item. For example, ventilation may be provided in a selected cover plate to aid in heat transfer, or a conduit may be connected to the receptacles and vent air out a top of the door 14 or 114.

Locating the PSU 40 in the header 12h allows easy access for repairs and installation/re-location and provides protection from extreme temperatures for both inswing and outswing installations. Preferably, a transformer of the PSU 40 is selected that is low in height that allows it to be placed in the header and requires no active cooling with, for example, the metal enclosure acting as a heat sink. Any such metal enclosure is electrically tied to earth and overall system ground to limit the voltage imposed by lightning, line surges, or unintentional contact with higher-voltage lines and to stabilize the voltage to earth during normal operation.

In use of the component ready door and frame, disclosed herein, the battery 50, the main controller 58, the sensors, the electric power door lock 34 and/or at least some of the electric devices are mounted into the edges of the latches of the door 114 in the prewired receptacles for integration, modularization, security, and serviceability. Alternatively, the power management controller 58 may be mounted to the door frame 12 or disposed outside the door assembly 11, such as at the wall adjacent the door frame 12.

The central ECU 58 allows the electric powered door latch 30 to be unlatched remotely, such as through a smartphone app, without the intervention of a person wishing to enter the building. To unlatch the door 14, the electric latch operator moves the central latch bolt 33 of the electric powered door latch 30 by an electric motor associated with the electric latch operator of the electric powered door latch 30 into the retracted position. Thus, the ECU 58 with the data links $60_1$, $60_2$, $60_3$, $60_4$ and 60L define a power/data/control management system for the door system 10, 110.

The ECU 58 may be adapted and configured for communication with a remotely located controller, such as available through a smartphone app, for operating at least one of the DC electric devices 34, 36 and the sensors in response to a command from the remotely located controller. The ECU 58 may limit the use of certain electric devices to prolong the amount of time the door system 10, 110 can operate while running on battery power.

A method of manufacturing the exterior residential door 114 for use with the outer door frame 12 comprises the following steps. First, the inner door frame 122 and the first door skin 23 assembled thereon is provided. The inner door frame 122 has a conduit formed by the wiring groove 72 on outer or inner edges thereof. Next, the wire harness 180 is positioned about the wiring grooves 72. The wire harness 180 has a first end on an exterior surface of the door 114 and a second end remote from the door 114. Then, at least one foam dam 83 is positioned in the wiring groove 72. The foam dam 83 seals the wiring groove 72 and the wire harness 180. After that, the second door skin 24 is positioned and secured on an opposite surface of the inner door frame 122, thereby creating an opening between the door skins 23, 24. Then, an expandable foam is introduced into the opening between the door skins 23, 24. Next, the expandable foam is foamed within the opening, thus creating a door core. The foam dam prevents the expanding foam from entering the wiring groove 72 and dislodging the wire harness 180. In other words, the step of introducing a foam core into the opening between the door skins 23, 24 is executed after the step of positioning the wire harness 180 about the wiring grooves 72.

The method of manufacturing the exterior residential door 114 also comprises the step of machining or otherwise forming the pockets 56, 66, 68 or 156 in the inner door frame 122 for receiving an electric device therein. The wire harness 180 is protected during the machining and manufacturing process, such as by a wire lock tube. The method of manufacturing the exterior residential door 114 further comprises the step of testing electrical quality of the door system 110 by testing the power supply unit 40, the main controller 58, the electric devices and the wire harness 180 by utilizing a secure Bluetooth connection and testing protocol.

The door system 110 can be configured by a user to enable both local and cloud integration and data storage. Specific examples where a user can configure setting of the door system 110 include:

using motion, ambient light, or door state sensors to turn on LED lighting, such as the hallway illumination light $36_4$ or the jamb LED lights $36_5$ and $36_6$;

using motion, ambient light, or door state sensors to control the electric power door lock 34;

using connected door lock sensors and video sensors to detect a user to unlock the door 114;

using door state sensor changes to activate home automation sequences, such as turning on interior lighting or for an announcement of occupancy; and using motion or ambient light sensors as a trigger for a smart glass of the door 114 to turn opaque for privacy and solar light management.

Those skilled in the art will recognize that the sensors communicating with the ECU 58 may be located on the building, the door frame 12 and/or the door 14 or 114 provided they are in communication with the main controller 58.

Also, the ECU 58 may notify a user that securing the power door lock 34 is not possible due to the door 14 or 114 being ajar or open. For this purpose, the door state sensor (or door sensor) 64 communicates with the ECU 58 via a wired or wireless connection, as best shown in FIG. 17A-17B. The door state sensor 64 monitors if the door 14 or 114 is ajar or closed (i.e., if the door 14 or 114 is properly aligned with the frame assembly 12) prior to activating the power door lock 34. A signal from the door state sensor 64 indicating that the door 14 is ajar is directed to the ECU 58 that, in turn, activates the electric door operator 52 to properly close the door 14 if the door 14 is ajar; i.e., not properly closed. Operation of the door lock 34 if the door 14 is not closed could result in damage to the door 14 and/or to the door lock 34. Further, if the door 14 is not closed and the power lock 34 is operated, the ECU may report that the door 14 is locked, when it is not. The door state sensor 64 thus minimizes activation of the lock 34 prior to the door 14 being properly closed. Similarly, one or more sensors may be provided to not only turn-on the LED light(s) but allow the electric powered door lock 34 to lock after determining that the individual has passed through the door 14 or 114 and the door 14 or 114 is closed, to communicate with a smartphone app to allow the owner to monitor activity around the door 14 or 114, to determine the status of the door 14 or 114, whether open or closed, and to determine whether someone is approaching the door 14 or 114.

As noted above, the door system 10 may comprise a powered door closer (or electric power door operator) 52 mounted to the frame assembly 12 and operated by high voltage AC electrical power at 120 volts, and the door state sensor 64 (in wireless or wired communication with the central ECU 58) configured to determine the state of the door 14 (open or closed). Alternatively, the electric door operator 52 may also operate at low-voltage DC electrical power. According to the present invention, the AC powered door closer 52 and the door state sensor 64, such as a Hall-effect or reed switch sensor, interact to close the door 14 when the door state sensor 64 determines that the door 14 is open. Capabilities of the door state sensor 64 may contemplate various "states" of the door or the door devices, i.e., locked/unlocked, open/closed, lights on/off, etc. Other sensors in the system can also be used to sense problems with the DC or AC electric devices themselves, for example, no WiFi or Bluetooth signal, too much power draw, not enough power draw, too hot, too cold, (for a back-up battery 50, for example), etc. The sensors 62, 64 and other sensors communicate signals to the ECU 58, which then determines the action to take in response to the signals and issues a command to the appropriate electric device 36. In this way, the door state sensor 64 may send a signal to the ECU 58 that the door 14 is open, and the ECU 58 may issue a command to door closer 52 to operate to close the door 14. The door open signal may be communicated by the door state sensor 64, such as on a periodic basis, on a timed basis, and may be in response to an inquiry, such as from the owner through use of a smartphone app.

The ECU 58 may work both locally amongst the electric devices 36, as well as be supplemented by cloud integration for more advanced control while the user is away from the home controller. In the door system 10 or 110, a user may access the power system of the door system 10 or 110 via a wireless connection or a PC or mobile device, such as through a smartphone app, to set up, configure and manage one or more powered electric devices 36. Moreover, a user may access data and have user settable options for both addition of electric devices as well as the diagnostic health of the attached electric devices 36 and/or the battery 50 that would be a more efficient method to service issues arising with the electric devices 36 and the battery 50. The smartphone app may be used to monitor activity around the door 14, to activate the power door lock 34 lock to lock and unlock, and to determine the status of the door 14 or 114, whether open or shut.

Therefore, a pre-wired smart ready door assembly 10 or 110 according to the present invention may include a power system and a door power management system with the ability to provide both high-voltage and low-voltage electrical power for operation of a plurality of electric devices and a power/data management controller integrated into the door assembly 11 or 111. For the plurality of electric devices integrated in the door assembly 11 or 111, the range of watts required, considering amperes and volts specifically required by each of the electric devices and use, varies widely from LED lighting at the low end, 2.9 watts per foot at 5 volts, to electromechanical door systems requiring extremely high amp output to move a door, typically over 500 watts at 120 (or 115) volts. Thus, the present invention provides two or more power supply options that better match power needs of electric devices to allow for easier integration and power management given the diversity of power requirements.

In the door systems described and enabled herein, a user may access the power system of the door systems via wireless connection and a PC or mobile device, such as through a smartphone app, to set up, configure and manage one or more powered connected electric devices 36. The smartphone app may be used to monitor activity around the door, to activate the electric powered door lock 34 to lock and unlock, and to determine the status of the door, whether open or shut. Moreover, a user may access data and have user settable options for both addition of electric devices as well as the diagnostic health of the attached electric devices and/or the battery that would be a more efficient method to service issues with the electric devices and the battery.

By providing a convenient way to integrate the electric devices (hardware) into the door assembly with power/data readily available, manufacturers of the electric devices can simplify the designs and provide consumers with cleaner designs that are hidden and integrated into the door and do not require replacement of batteries. Furthermore, the invention enables integration of the electric devices into the door assembly in a standardized way that allows convenient serviceability of the electric devices. Embedding these devices into the door also protects against theft of the electric devices.

The installed electric devices are "integrated" into the pre-wired door assembly according to the present invention so that the door maintains structural integrity, insulation performance, and is free of distortion or other aesthetic defects.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. An exterior, residential door system, comprising:
   an outer door frame adapted to be mounted within an exterior opening of a residence;
   an exterior, residential door pivotally attached to the outer door frame;
   at least one electric device installed on the door;
   a main controller mounted in a pocket formed in a stile of the door;
   an electric power supply unit operably associated with the door; and
   a wire harness integrated into the door for transmitting electric power and electrical signals between the electric device, the main controller and the source of electric power, wherein the door and the outer door frame each includes a respective wiring conduit defined by respective grooves that are cut, routed or extruded into the door and the outer door frame for receiving and routing the wire harness to connect with the at least one electric device;
   wherein the main controller is configured to cooperate with the wire harness to supply power to the at least one electric device and to supply operating signals to the at least one electric device for operating the at least one electric device and to receive operational signals from the at least one electric device responsive to the operating signals.

2. The door system of claim 1, further comprising a wiring mounting device secured to a front side of the outer door frame facing the door when the door is closed, wherein the wiring mounting device is configured for mounting power and data wiring on the outer door frame.

3. The door system of claim 2, wherein the wiring mounting device includes a base member and a snap-on protective cover removably attachable to the base member.

4. The door system of claim 3, wherein the outer door frame includes hinge side and latch side jamb members and a header connecting upper ends of the hinge side jamb member and the latch side jamb member, and wherein the base member is secured to a front side of at least one of the hinge side jamb member, the latch side jamb member and the header of the outer door frame so as to face the door when the door is closed.

5. The door system of claim 1, wherein the door comprises an inner door frame formed with an inner wiring groove defining the respective wiring conduit of the door.

6. The door system of claim 5, wherein the inner door frame includes first and second stiles and a top rail extend between the first and second stiles, and wherein at least one of the first and second stiles and the top rail is formed with the inner wiring groove.

7. The door system of claim 1, wherein the outer door frame includes at least one of an inner wiring groove formed on a front side of the outer door frame and an outer wiring groove formed on a back side of the outer door frame, and wherein the inner wiring groove and the outer wiring groove define the respective wiring conduit of the outer door frame.

8. The door system of claim 7, wherein the outer door frame includes first and second jamb members and a header connecting upper ends of the first and second jamb members, and wherein at least one of the first and second jamb members and the header is formed with at least one of the inner wiring groove and the outer wiring groove.

9. An exterior, residential door system, comprising:
an outer door frame adapted to be mounted within an opening of a residence;
an exterior, residential door pivotally attached to the outer door frame;
a DC power supply unit mounted in the outer door frame and configured to be electrically connected to an AC power unit disposed adjacent the outer door frame, the DC power supply unit configured to convert AC power to DC power and to step down the voltage of the DC power so that the DC voltage is less than the AC voltage;
a DC electric device mounted to the door or the outer door frame; at least one sensor mounted to or proximate the door;
a main controller mounted in a pocket formed in a stile of the door, the outer door frame, and proximate the door system; and
a wire harness integrated into the door system for transmitting electric power and electrical signals between the main controller, the DC electric device, the at least one sensor, and the DC power supply unit, wherein the door and the outer door frame each includes a respective wiring conduit defined by respective grooves that are cut, routed or extruded into the door and the outer door frame for receiving and routing the wire harness;
wherein the main controller is configured to cooperate with the wire harness to supply DC power to the DC electric device and the at least one sensor, and to supply operating signals to the DC electric device in response to signals from the at least one sensor for operating the DC electric device and to receive operational signals from the DC electric device responsive to the operating signals.

10. The door system of claim 9, further comprising an electric power transfer device electrically connecting the DC power supply unit to the main controller via the wire harness.

11. The door system of claim 9, wherein the DC electric device includes at least one of an electric power door lock mounted to the door and a camera.

12. The door system of claim 11, wherein the DC electric device further includes at least one of a door illumination light and a sidejamb light both mounted to the outer door frame.

13. The door system of claim 12, wherein the door illumination light is mounted to the header of the outer door frame, and wherein the side jamb light is mounted to the latch side jamb member of the outer door frame.

14. The door system of claim 11, wherein the DC electric device further includes at least one of a doorbell, a motion sensor, an ambient light sensor, a door state sensor all mounted to the door or the outer door frame.

15. The door system of claim 9, further comprising a back-up battery mounted to the door and electrically connected to the DC electric device.

16. The door system of claim 9, wherein the DC power supply unit includes an AC to DC power converter.

17. The door system of claim 9, wherein the door comprises an inner door frame including first and second stiles and a top rail extend between the first and second stiles, and wherein at least one of the first and second stiles and the top rail is formed with a wiring groove defining the respective wiring conduit of the door.

18. The door system of claim 9, further comprising a wiring mounting device secured to the outer door frame, wherein the wiring mounting device is configured for mounting power and data wiring on the outer door frame.

* * * * *